March 28, 1967          J. H. DOYLE          3,311,910
ELECTRONIC QUANTIZER
Original Filed Feb. 5, 1962                 10 Sheets-Sheet 1
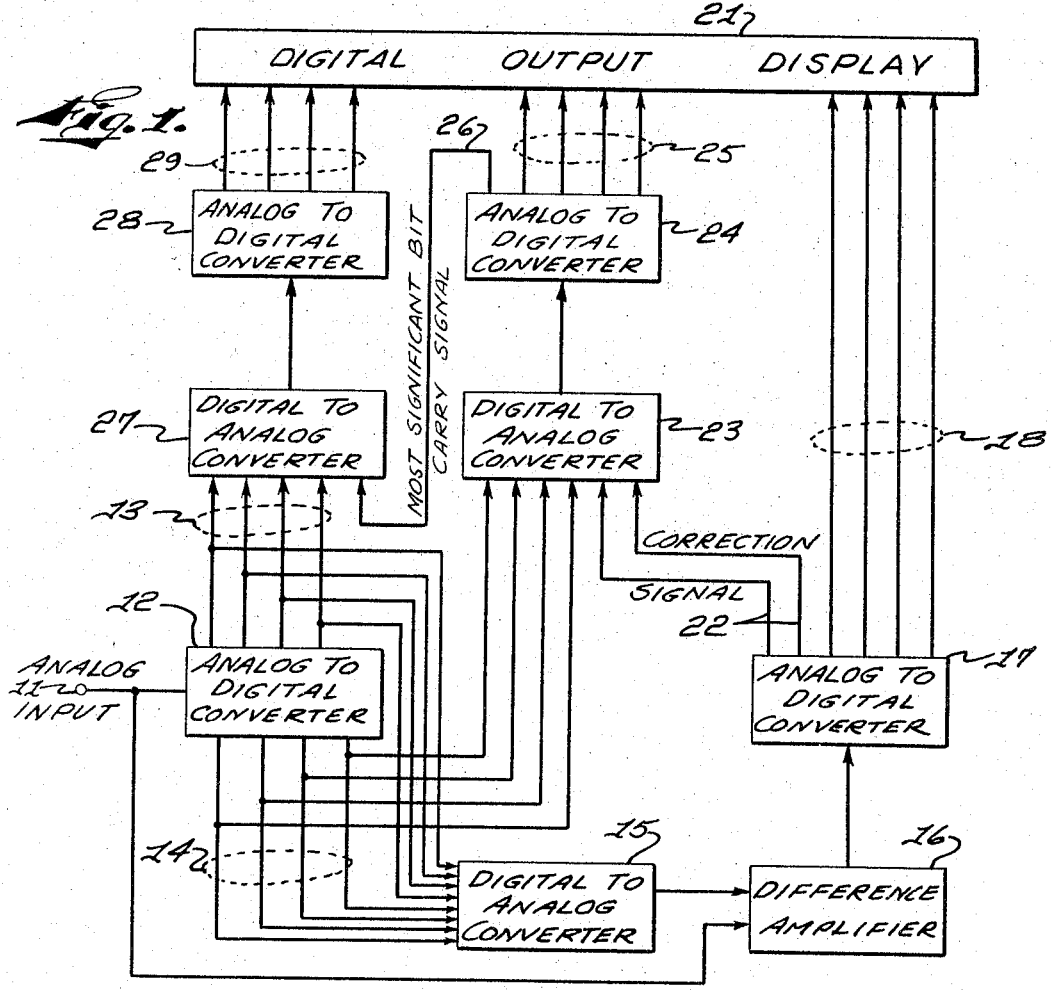
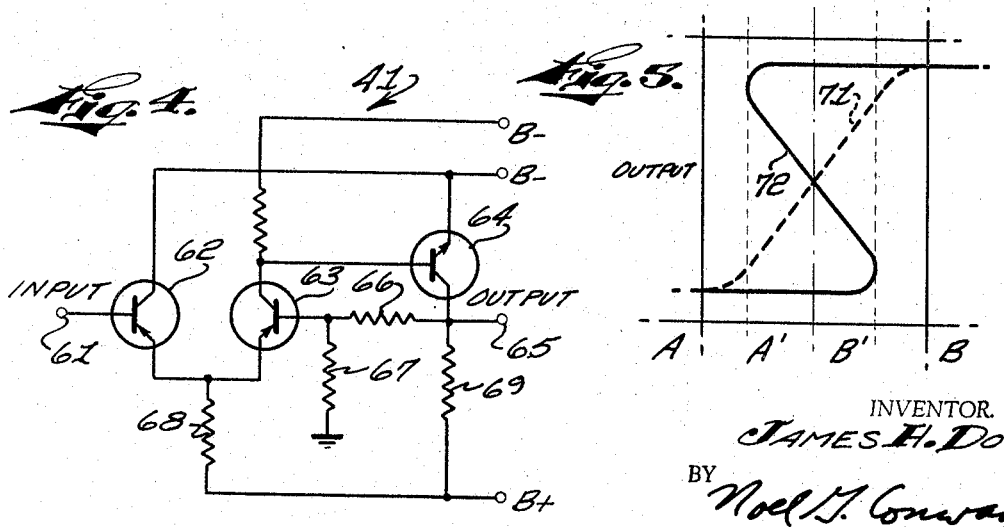
INVENTOR.
JAMES H. DOYLE
BY
Noel G. Conway
ATTORNEY

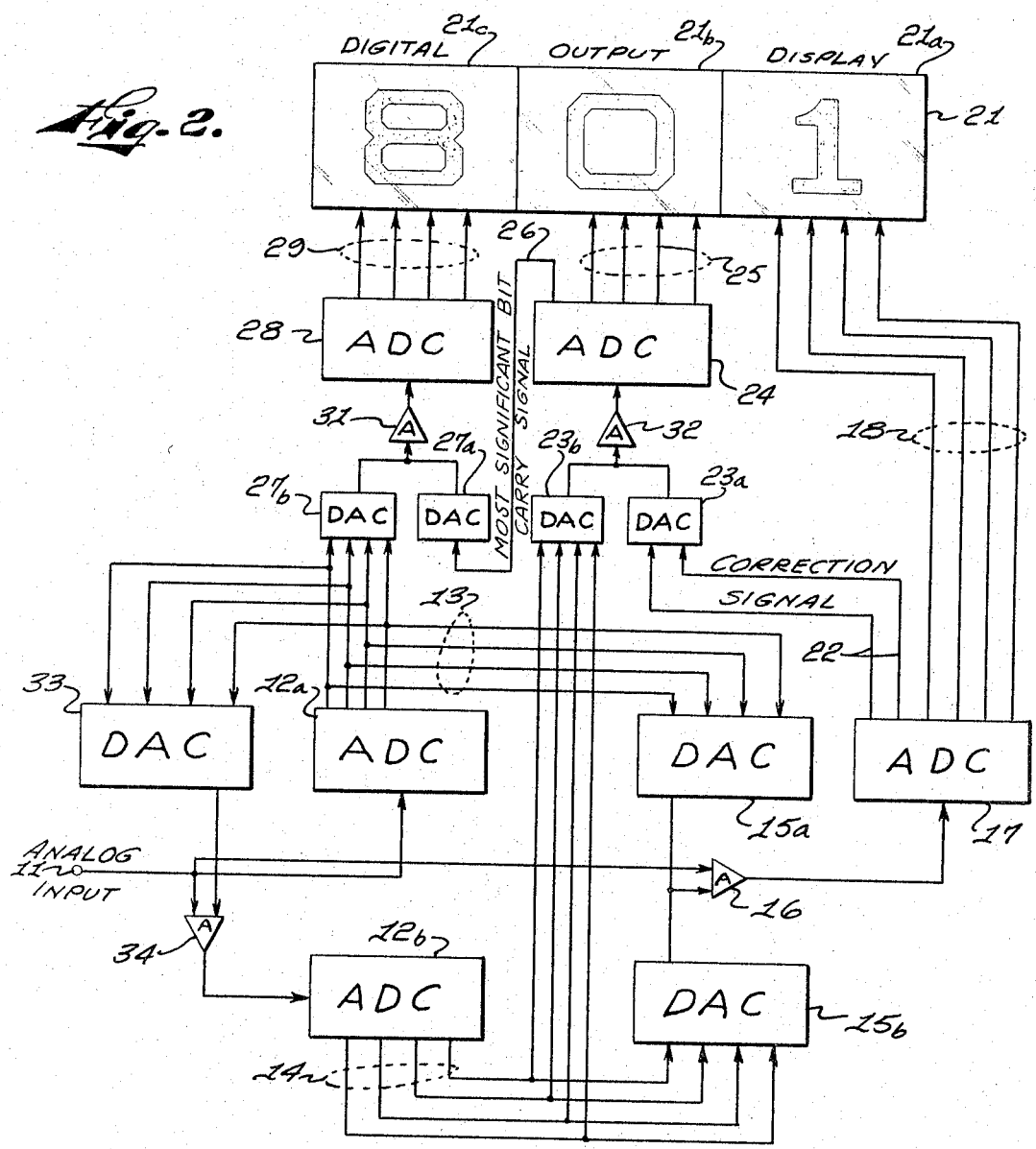

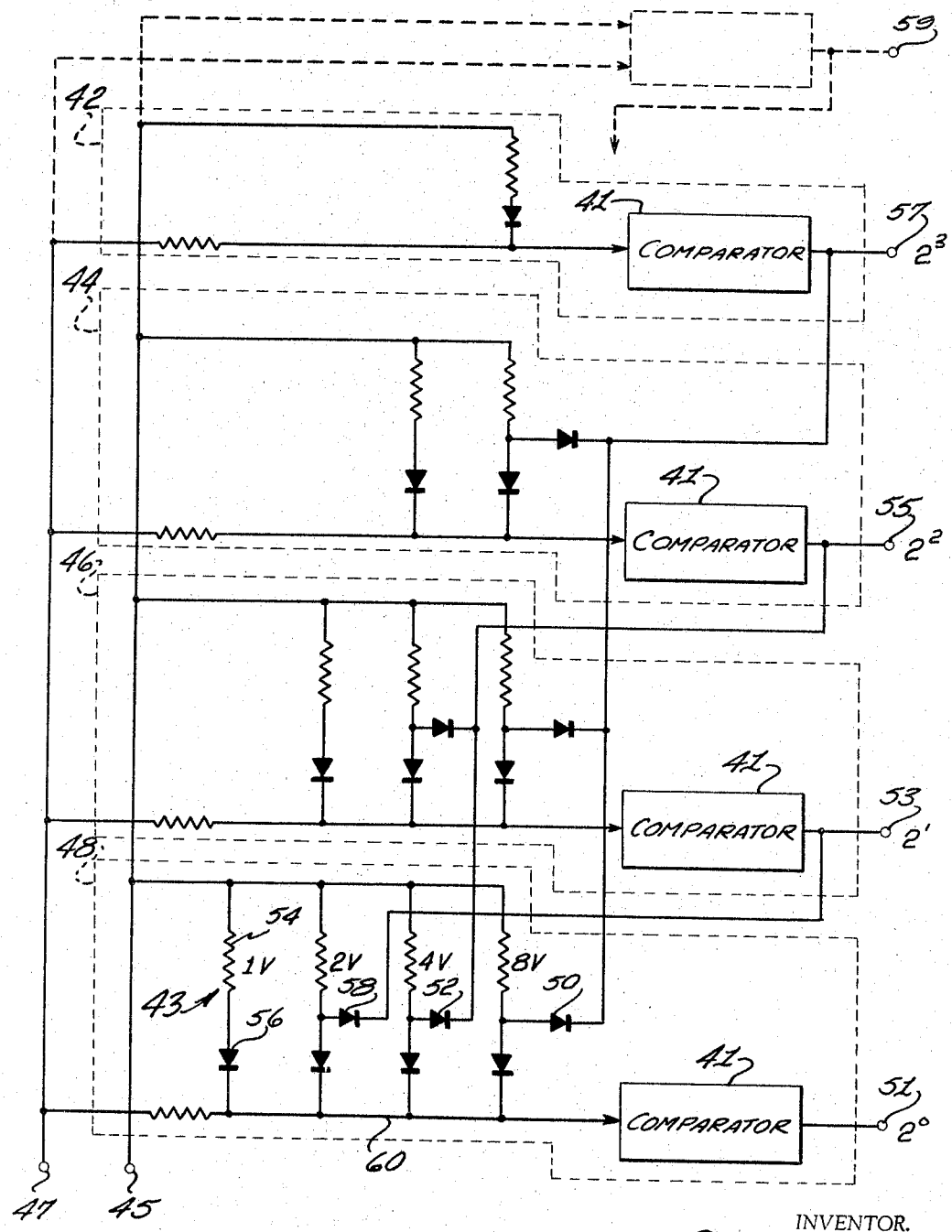

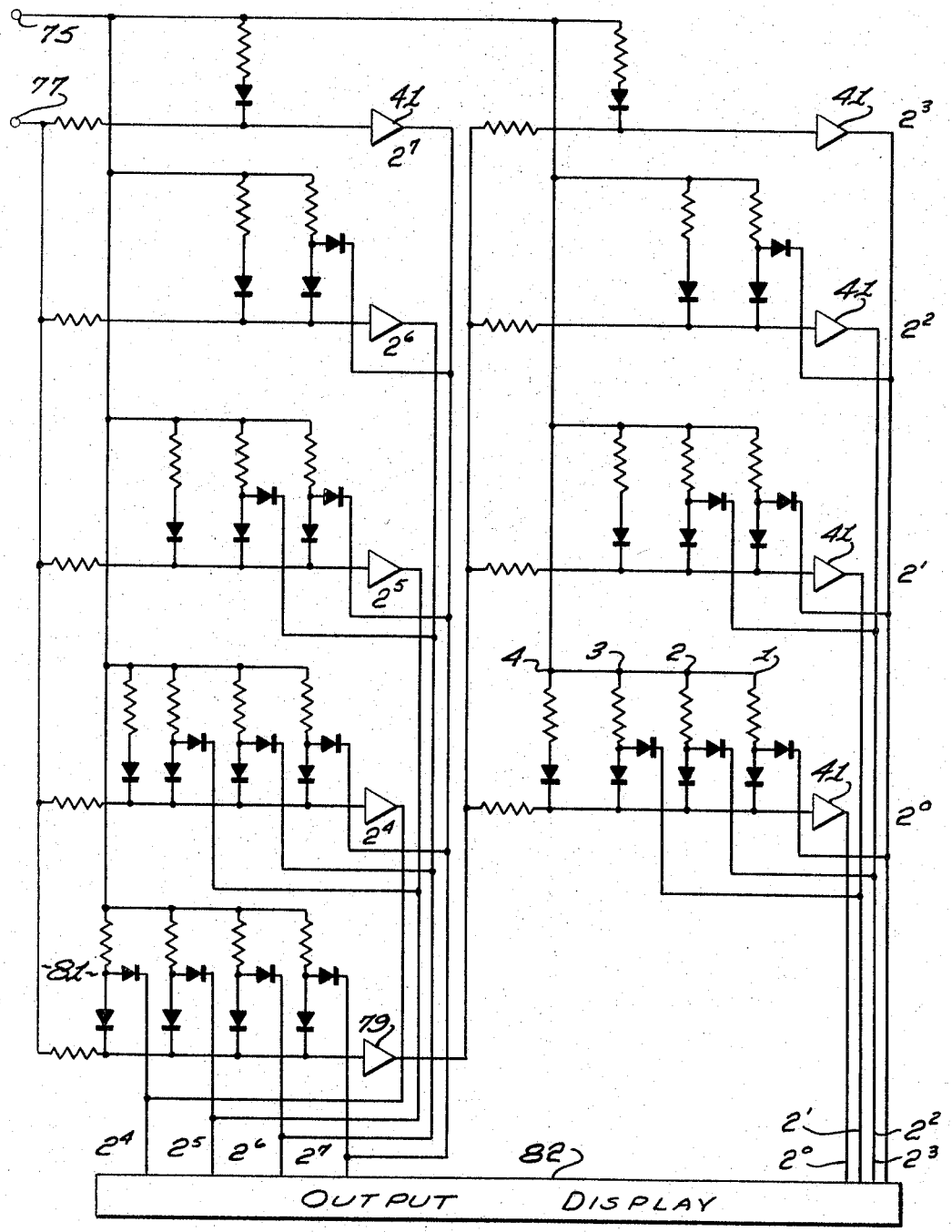

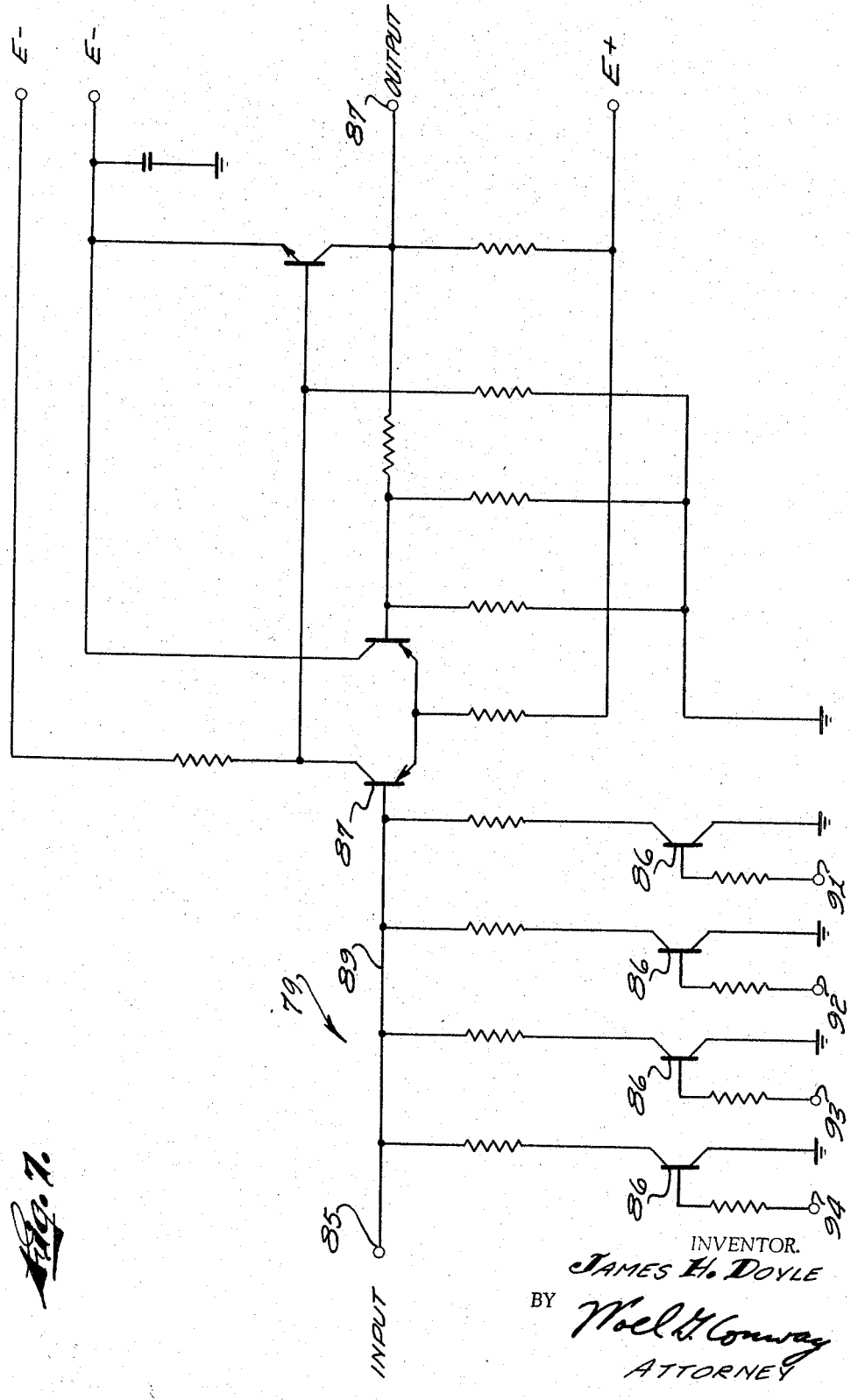

March 28, 1967 — J. H. DOYLE — 3,311,910
ELECTRONIC QUANTIZER
Original Filed Feb. 5, 1962 — 10 Sheets-Sheet 6

INVENTOR.
JAMES H. DOYLE
BY Noel G. Conway
ATTORNEY

INVENTOR.
JAMES H. DOYLE
BY Noel G. Conway
ATTORNEY

March 28, 1967 J. H. DOYLE 3,311,910
ELECTRONIC QUANTIZER
Original Filed Feb. 5, 1962 10 Sheets-Sheet 9

INVENTOR.
JAMES H. DOYLE
BY Noel D. Conway
ATTORNEY

INVENTOR.
JAMES H. DOYLE
BY Noel G. Conway
ATTORNEY

United States Patent Office 3,311,910
Patented Mar. 28, 1967

3,311,910
ELECTRONIC QUANTIZER
James H. Doyle, Garden Grove, Calif.
(2003 Ivy Hill Lane, Orange, Calif. 92667)
Continuation of application Ser. No. 172,377, Feb. 5,
1962. This application Dec. 27, 1963, Ser. No. 333,972
38 Claims. (Cl. 340—347)

This invention relates to quantizer devices and more particularly to an asynchronous electronic quantizer system for digitizing analog signals and transmitting digital signals.

This application is a continuing application of my earlier filed application entitled, Electronic Quantizer, bearing Ser. No. 172,377 and filed on Feb. 5, 1962, now abandoned.

The conversion of analog signals to digital signals in electronic systems, known as the process of electronic quantizing, finds a wide usage in a variety of information handling systems. Utilizing electronic quantizers for converting analog signals into digital code signals such as the binary code provides an accurate and speedy handling of information in two state devices and associated circuitry. Electronic quantizers may provide many useful functions in a given data processing system such as a digital computer and may accomplish the conversion of analog signals into digital signals with high speed and accuracy.

The figure of merit of an electronic quantizer is governed by such basic parameters as the number of output digital bits, the stability of representation, the speed of the analog-to-digital conversion, and the accuracy of the reconstructed digital output.

It is well known in the quantizer art that accuracy and speed of conversion of the analog-to-digital converter devices bear an inverse relationship to each other. That is, if accuracy is improved, speed of conversion suffers and vice versa.

Therefore, the one problem that designers are always faced with in the design of an electronic quantizer is the attainment of a reasonable speed of conversion from analog signals to digital signals with a corresponding high accuracy. Many of the advantages associated with the handling of information by means of digital signals are realized only when the conversion from analog signals to digital signals is accomplished with high speed and accuracy.

Proposed electronic quantizers for conversion of an analog signal into a digital signal such as a binary coded signal are generally designed to sacrifice accuracy of conversion in order to attain a reasonable speed of operation. All electronic analog-to-digital systems such as for example, an apparatus wherein an analog signal is applied to a pulse width modulator whose output is a series of pulses, are seriously deficient in the speed parameter in that the conversion time between the application of the analog signal and the reading of a digital output is relatively long. Similarly, systems in which an analog signal is compared to a reference standard voltage wherein if the standard voltage is less than the analog signal, the reference voltage is subtracted from the analog signal yielding a difference signal, meet requirements for high speed, but are deficient in accuracy in that the output readings of the comparator are not continuous. Similarly, other analog-to-digital converting systems including the type represented by shaft encoding are similarly deficient, either in speed or in accuracy. Accordingly, it is an object of this invention to provide an electronic quantizer for performing analog-to-digital conversion operations in a rapid manner at a precision accuracy.

The electronic quantizer system of the present invention performs a rapid conversion of an analog signal to a predetermined digital code at a relatively high accuracy. The accurate and rapid transaction from analog-to-digital signals is accomplished with an all electronic system involving few components of standard design and non-precision qualities. A high system accuracy is accomplished by a unique electronic quantizing system including high speed analog-to-digital converters of limited accuracy, relatively short conversion time periods, high over-all accuracy, and resolution, together with simplified circuitry for the achievement of reliability, low cost of manufacture and flexibility.

It is therefore, another object of this invention to provide an electronic quantizer for converting an analog signal to a digital signal having components of limited accuracy arranged in a system for providing high over-all accuracy.

It is a further object of this invention to provide an asynchronous electronic quantizer utilizing parallel approximation for digitizing analog signals.

It is a still further object of this invention to provide an electronic quantizer system wherein the lesser significant bit circuitry of the digital output is capable of operating within a range for overcoming errors in the more significant bit group of the digital output.

It is another object of this invention to provide a high speed conversion system for converting an analog input signal to a multibit code digital signal.

It is still another object of this invention to provide an electronic quantizer utilizing a digital code translator for performing arithmetic operations without reduction to analog quantities.

Other objects and features of the present invention will become apparent when considered with the following specification and claims in which:

FIGURE 1 is a block diagram illustrating the principal aspect of the electronic quantizer of the invention.

FIGURE 2 is a block diagram of an electronic quantizer of FIGURE 1 illustrating in more detail the features of the system.

FIGURE 3 is a circuit diagram partly in block of a four bit analog-to-digital converter as utilized in the system of FIGURE 2.

FIGURE 4 is a circuit diagram of a comparator for use in the converter of FIGURE 3.

FIGURE 5 is a hysteresisgraph illustrating the switching characteristics of the comparator of FIGURE 4.

FIGURE 6 is a circuit diagram partly in block of an analog-to-digital converter arrayed as a plurality of cascaded comparison stages.

FIGURE 7 is a circuit diagram of a typical summing amplifier for use in the converter of FIGURE 6.

Figure 8:
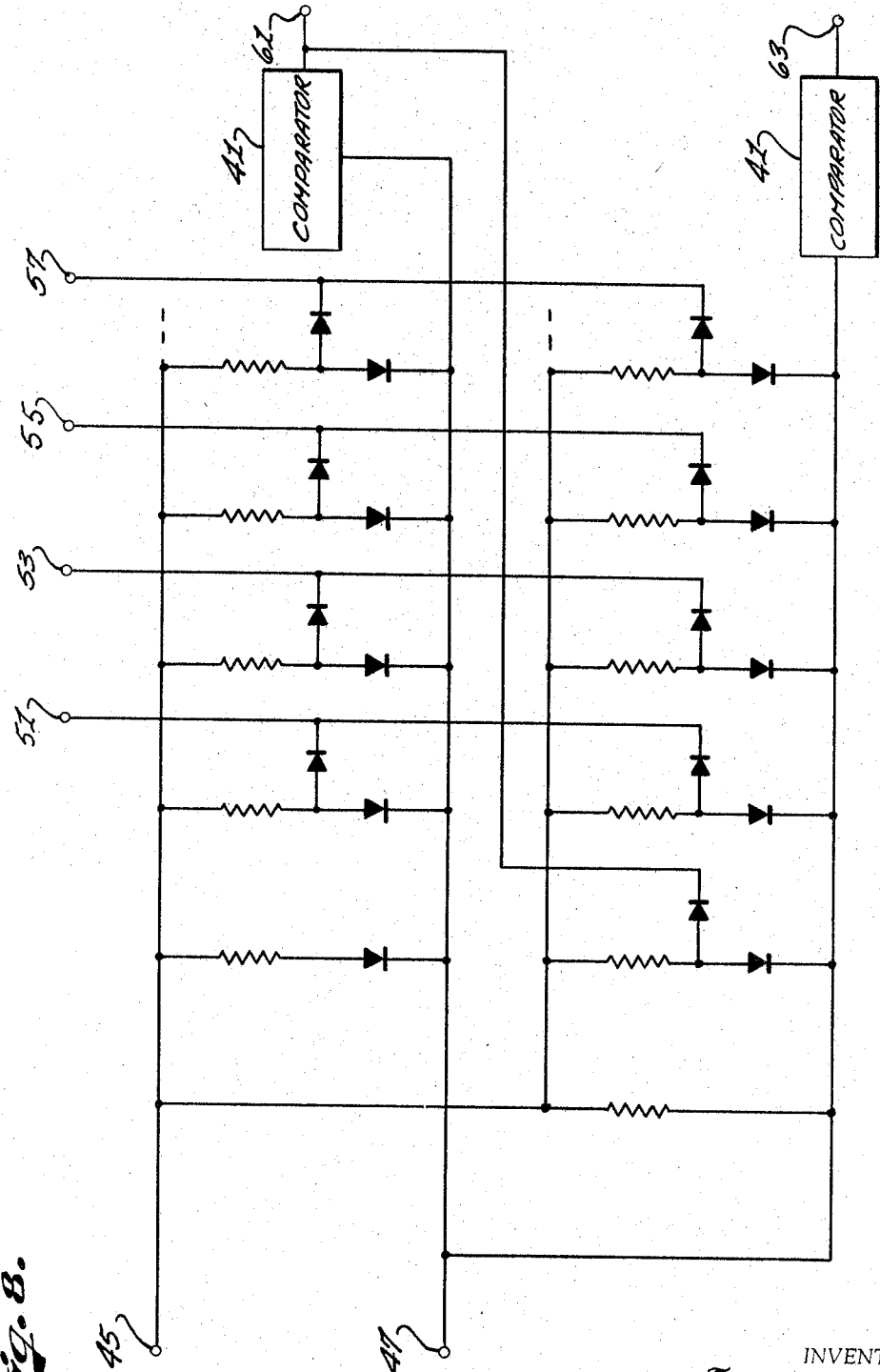
FIGURE 8 is a circuit diagram partly in block of the fifth and sixth bit element of a six bit analog-to-digital converter.

According to a principal aspect of the electronic quantizer system of the invention, an analog signal is converted to a binary coded digital signal by means which include an analog-to-digital converter responsive to an initial analog signal for producing a highest significant group of multi-bit digital signals. A digital-to-analog converter responsive to the highest significant group of digital signals produces analog signals which are subtracted from the initial analog signal to produce a difference analog signal. Means including analog-to-digital circuitry responsive to the difference analog signals are provided for producing additional lowest significant groups of multi-bit digital signals. A digital code translator is provided for combining the additional groups of multi-bit digital signals with the highest significant group of multi-bit digital signals to produce a digital signal representing the initial analog signal.

According to a further aspect of the invention, the digital code translator of the electronic quantizer includes means for performing the arithmetic operations of addition, multiplication and division. Included within the digital code translator is a digital-to-analog converter for receiving digital signals to be added. An amplifier responsive to the analog output of the digital-to-analog converter and an analog-to-digital converter responsive to output of the amplifier provide the digital output signals in accordance with the arithmetic function to be performed.

Other important aspects of the invention include an electronic circuit for handling the output digital signals from the analog-to-digital converter which includes a hysteresis circuit to provide decisive on and off representation of the digital output signals, a parity generator, and compensating circuit means.

Referring now to FIGURE 1, there is illustrated in block diagram form an electronic quantizer system according to the invention for converting an analog signal into a binary coded digital signal. The analog input signal is applied to a terminal 11 and the binary coded output digital signal may be produced in a preferred embodiment at a digital output display 21. An analog-to-digital converter 12 responsive to the analog signal at the terminal 11 produces a higher significant group of digital signals 13 and a lower significant group of digital signals 14. In a preferred embodiment, the analog-to-digital converter 12 is an eight bit converter producing four higher significant bits at the group 13 and four lower significant bits at the group 14. A digital-to-analog converter 15 of high precision characteristics is connected to be responsive to both the higher significant group 13 and the lower significant group 14 of digital signals from the analog-to-digital converter 12. The output to the digital-to-analog converter 15 is an analog signal representing the value of the digital output signal from the analog-to-digital converter 12. The analog output signal from the digital analog converter 15 which represents the coarse output digital signal from analog-to-digital converter 12 is subtracted from the analog signal from input terminal 11 at a difference amplifier 16 which presents an output analog difference signal which represents the error of the coarse analog-to-digital converter 12. An analog-to-digital converter 17 which in the preferred embodiment may comprise six bits, is responsive to the analog error signal from the difference amplifier 16 to produce a group of digital signals including the lower significant portion 18 of the group represents the least significant group of the binary coded digital signal appearing at the digital output display 21 and a higher significant portion 22 of the group represents a higher significant bit correction signal in accordance with the difference analog signal from the difference amplifier 16.

Correction signal 22, representing the two higher significant bits in the preferred embodiment, is fed to a digital-to-analog converter 23 and there combined with the lower significant group 14 of digital signals in an addition operation to produce an analog signal which is fed to an analog-to-digital converter 24 whose output is represented by a lower significant portion 25 comprising four bits in the preferred embodiment which represents a higher significant group of the binary coded digital signal appearing at the digital output display 21. A higher significant portion 26 of the output from the analog-to-digital converter 24 represents the most significant correction signal and is fed to the input of a digital-to-analog converter 27 and there combined in an addition operation with the higher significant group 13 of digital signals. The analog ouput of the digital-to-analog converter 27 is presented to an analog-to-digital converter 28 whose output represents the highest significant group 29 of the binary coded digital signal fed to the digital output display 21.

In the electronic quantizer of FIGURE 1, in the preferred embodiment, correction signals are developed in the system and applied to the highest significant group and higher significant group of digital signals. The correction signals produced at bits 22 and bit 26 have a sufficient digital range corresponding to a portion of the digital signal they are combined with. For example, the output of the analog-to-digital converter 17, six bits in the preferred embodiment has a sufficient operating range (i.e., the sum of the significances of the bits) to provide the four least significant output bits 18 and two correction signal bits 22. The bits 22 correspond in order to the two least significant bits of the group 14 which they are combined with. Similarly, the output of the analog-to-digital converter 24, 5 bits in the preferred embodiment, produce 4 bits, 25 and a correction bit 26 which corresponds in order to the least significant bit of the group 13.

As may be realized from the above description of the device of FIGURE 1, a highly accurate digital signal is produced at the digital output display 21 representing the analog signal fed to the input terminal 11. The correction signals fed on the bits 22 and bit 26 are combined with the higher significant group 13 and lower significant group 14 from the coarse analog-to-digital converter 12 to provide a highly accurate representation of the analog input signal at the terminal 11.

Referring now to FIGURE 2, there is illustrated in a more detailed block diagram the electronic quantizer of FIGURE 1. In FIGURE 2 there is shown a device for converting an analog input signal at the terminal 11 to a digital output signal at the display 21 which may comprise twelve output bits coded in a binary decimal form to provide a most significant decimal order at the display 21c, a higher significant decimal order at the display 21b and a lowest significant decimal order at the display 21a. In FIGURE 2 an analog input signal presented at the terminal 11 is connected to an 8 bit digital signal of higher significant group 13 and lower significant group 14 by an arrangement in which 4 bit analog-to-digital converters 12a and 12b combine in a manner to be more fully described hereinafter to provide an 8 bit analog-to-digital converter. Suffice it to say at this point that the analog signal at terminal 11 is converted by analog-to-digital converter 12a to the highest significant group 13 of digital signals. A digital-to-analog converter 33 converts the group 13 signals to an analog signal which is subtracted from the analog input signal from terminal 11 at an amplifier 34. The analog-to-digital converter 12b is responsive to the output of the amplifier 34 to produce the lower significant group 14 of coarse digital signals.

The group 13 and 14 digital signals are converted to analog signal by respective digital-to-analog converters 15a and 15b whose outputs are combined to form one input to the difference amplifier 16 which subtracts the analog signal representing the output of the analog-to-digital converters 12a and 12b from the analog signal at the input terminal 11 to provide a difference error analog signal to the analog-to-digital converter 17.

The six bit analog-to-digital converter 17 produces a lower significant portion 18 representing the lowest significant group of digital output signals which are fed to the lowest significant display portion 21a. The two highest significant portions of the six bit output of the analog-to-digital converter 17 represent a correction signal in accordance with the error signal from the amplifier 16 and are fed into a digital-to-analog converter 23a which converts the correction signal to an analog signal and feeds it to the input of an amplifier 32. The digital-to-analog converter 23b is responsive to the lower significant group 14 of digital signals and convert the four bit signal to an analog signal and presents it to amplifier 32 along with the correction signal of 22, which is combined with the group 14 in digital-to-analog converters 23a and 23b and presented to the amplifier 32 which provides an analog signal to the analog-to-digital converter 24. The output of the five bit analog-to-digital converter 24 includes a lower significant portion 25 of four bits which is presented to the portion 21b of the output display 21 representing the second significant bit display of the digital output signal. The highest bit 26 of the output of the analog-to-digital converter 24 is presented to the digital-to-analog converter 27a where it is combined with the higher significant portion 13 of the analog-to-digital converter 12a in the digital-to-analog converter 27b. The amplifier 31 responsive to the combined signals presents an analog signal to the analog-to-digital converter 28 which provides a four bit output 29 which is fed to the most significant bit display portion 21c of the digital output display 21.

In operation of the quantizer system of FIGURE 2, an analog input signal of 8.01 units of magnitude will be assumed at the input terminal 11 for explanation purposes. The quantizer of FIGURE 2 is applicable to any number system including a binary coded decimal system to be described for illustration purposes wherein the output indications on the portions 21c, 21b, and 21a of the digital output display 21 are coded directly in terms of the decimal number system. The analog signal at terminal 11 is converted by the four bit analog-to-digital converters 12a and 12b into a digital signal whose value will vary from the true 8.01 magnitude due to inherent inaccuracies in the converters. Because of this inherent error, the output of the most significant group 13 may be 7, for example, and the output of the least significant group 14 may be 0.9, for example, representing a total digital signal of 7.9. Thus it may be seen that the digital signal output is in error by a value equal to 8.01 minus 7.9, or 0.11. The group 13 carrying the decimal 7 in binary form is converted to an analog signal by the digital-to-analog converter 15a, and the group 14 carrying the decimal 9 in binary form is converted to an analog signal by the digital-to-analog converter 15b. The outputs of digital-to-analog converters 15a and 15b are combined and presented to differential amplifier 16 along with the initial analog signal of 8.01 value from the terminal 11. The analog output of the diffferential amplifier 16 representing a value of 0.11 is converted to a digital signal by the six bit analog-to-digital converter 17 with the least significant portion 18 providing a decimal coded signal of .01 to the least significant bit display 21a. The most significant correction portion 22 carries a signal equivalent to 0.1 to the digital-to-analog converter 23a whose analog output is combined with the analog output of the digital-to-analog converter 23b, whose input from the least significant portion 14 is a signal equivalent to 0.9.

Amplifier 32 presents a signal to analog-to-digital converter 25 equal to 0.9 plus 0.1 or 1.0. The output of analog-to-digital converter 25 of the four bit least significant portion 25 is .0 which is displayed on the second significant bit display 21b. The most significant correction portion 26 of the output of the analog-to-digital converter 27a whose analog output is combined with the output equal to 1 which is presented to the digital analog converter 28a whose analog output is combined with the output of the digital-to-analog converter 27b receiving an input signal from the most significant bit 13 equivalent to 7. The output of the amplifier 31, a signal equal to 7 plus 1 or 8 is fed to the analog-to-digital converter 28 which converts it to a four bit signal at the bits 29 which are displayed on the significant display 21c as the number 8. Thus it may be seen that the analog input signal equivalent to 8.01 is displayed on the digital output display 21.

For a true binary code the operation of the quantizer of FIGURE 2 in converting an analog signal of a binary number 11010001.1111 (equivalent to the decimal number $209^{15}/_{16}$), for example, into a digital signal, is as follows: The analog input signal at the terminal 11 is converted to a most significant group 13 of the analog-to-digital converter 12a of 1100 (decimal 192) and converted to the lower significant group 14 of the analog-to-digital converter 12b of 1111 (decimal 15). Thus, it may be seen that the output of the digital-to-analog converters 12a and 12b is equivalent to 207 indicating an error of $2^{15}/_{16}$ from the true value of the analog input signal at the terminal 11. The output of digital analog converters 15a and 15b combined to provide an analog signal equivalent to 207 which is subtracted from the analog signal of $209^{15}/_{16}$ at the input terminal 11 in the difference amplifier 16 which provides a difference error signal of $2^{15}/_{16}$. The error signal is converted by the analog-to-digital converter 17 into a six bit binary signal of 10.1111 the least significant portion 18 displays a binary signal at the display 21a of 1111 (decimal $^{15}/_{16}$).

The most significant portion 22 carries a binary signal of 10 (decimal 2) which is fed to digital analog converter 23a whose analog output is combined with the output of digital-to-analog converter 23b receiving an input signal from the lower significant portion 14 of 1111 (decimal 15). The two bits of the most significant portion 22 are added to the lower significant bits of the input signal to digital-to-analog converter 23b and amplified by the amplifier 32 to present a signal to analog-to-digital converter 24. The output of analog-to-digital converter 24 is 10001 with the 0001 appearing at the bits 25 and fed to the second significant display 21b. The 1 appears on the most significant correction portion 26 and is combined with the output of the digital-to-analog converter 27b at the digital-to-analog converter 27a, and amplified by amplifier 31 which presents an analog signal to analog-to-digital converter 28. The output of the analog-to-digital converter 28 is then a signal equal to 1100 plus 1 which is 1101 (decimal 208) at the most significant bit display 21c. Thus it is seen that the binary signal 1101001.1111 appears at the digital output display 21.

The quantizers of FIGURE 1 and FIGURE 2 show a system for converting an analog signal to a digital signal having three orders of four bits each in the display 21. It is to be realized that the number of bits and stages shown are for explanation purposes only and that the system is equally applicable to any number of bits in any number of stages.

Referring now to FIGURE 3 there is illustrated a preferred embodiment of a four bit analog-to-digital converter to be utilized in the systems of FIGURE 1 and FIGURE 2. The analog-to-digital converter of FIGURE 3 digitizes an analog signal derived from an input terminal 47 and presents a digital output signal at the terminals 51, 53, 55 and 57 in terms of four binary characters or bits shown as the binary bits $2^0$, $2^1$, $2^2$, and $2^3$ or the corresponding decimal digits, 1, 2, 4 and 8 respectively. The analog signal at the input terminal 47 is coupled to four comparator stages shown as the dotted lines 42, 44, 46 and 48. Each of the comparator stages 42 to 48 comprise a binary weighted network, such as 43 and an individual comparator 41 coupled to receive the signal from its associated network. A source of reference voltage appears at the terminal 45 and is connected to the input circuit for each of the weighted networks of the four comparator stages.

Each of the weighted networks 43, for example, include a single arm that includes a resistor 54 which is coupled between the input reference terminal and the input circuit of the comparator 41 by means of a diode 56. A corresponding resistor and its associated diode is included as a left-hand arm of each network 43 for the other comparator stages 42, 44 and 46, all of which arms arrange to be normally conductive to apply a pre-selected bias weight to the input circuit of comparator 41. The pre-selected bias voltages provided by these arms differ in accordance with the binary weighting of the associated comparator stage.

The bias weights for the comparator stages 42, 44, 46 and 48 may be considered to provide potentials of 8, 4, 2 and 1 weight, respectively.

The networks 43 for each of the comparator stages except the highest order binary stage 42, have additional arms arranged in parallel circuit relationship with the described left-hand arms corresponding in number to the number of higher order comparison stage elements. Each of these arms are defined to be in a normally non-conductive condition and switch to a conductive position for providing a potential to the input circuit for the associated comparator 41.

Specifically, in the network 43 for the comparator 48 it will be seen that three arms are shown in which arms each include a resistor and a diode connected in series in the same fashion as the left-hand arms and the series combination connected in parallel with these left-hand arms. The right-hand arm for the network 43 includes a diode 50 connected to a common point between the resistor and the series diode to the output circuit of the comparator 41 for the circuit 48. In the same fashion the other two arms of the stage 48 each include a separate diode, 52 and 58 respectively, connected to a common point between the resistor and the diode to the output of the comparator 41 indicating the value of $2^0$. The circuit operates in the manner that when the comparator indicates the binary value 0 the current from the reference source 45 is passed from the weighted resistors of the arms by means of the diodes 50, 52, and 58 and when the binary 1 is indicated, the current is switched to the series diodes into a common bus 60 for the input circuit of the comparator 41. Switching actions of the parallel diodes in the networks 46 are such that for example, when the output signal is received from the terminal 57 and presented to the diode 50 the diode 50 switch prevents a signal from the 8 volt resistor appearing at the input of the comparator 41.

Each of the other binary weighted networks 43 include similarly defined arms corresponding to the number of higher order comparator elements that are coupled to the output circuits for each of the comparators for modifying the preselected bias voltage for the individual comparator. To this end, each arm for the networks 43 that is connected to the $2^3$ output circuit 57 provides a bias weight of approximately 8 volts. Therefore, each right-hand arm to the comparator stages 44, 46, and 48 has a plus 8 weight combined with the preselected positive bias potential only when the $2^3$ output is indicating a binary 1. Thus each of the comparator stages except the comparator 42 is provided with at least a single arm that is normally non-conductive and is switched to a conductive state in accordance with the production of a binary 1 output indication from one of the comparator stages representing a higher binary order. Positive output voltages from the networks 43 are combined with the negative voltage applied from the analog source 47 to be digitized in a manner so that the signal applied to each of the comparators 41 is the difference between these voltages.

A typical digitizing operation will now be examined for the circuit of FIGURE 3. When the analog signal to be digitized is zero, it will be recognized that each of the comparator stages 42 to 48 will provide a positive output indication or binary zero, since the left-hand arms of networks 20 each provide a positive bias voltage. As the analog signal decreases in a negative direction and reaches a negative one volt, it will be seen that the difference between the minus one volt and the voltage provided by each of the left-hand arms for the comparator stages 42, 44 and 46 will be positive potentials since each of these arms provide a potential greater than one volt.

The left-hand arms of the network 43 for the comparator 48, however, provides a positive one volt and when combined with the negative one volt analog signal, provides essentially a zero input voltage and should be considered slightly negative for triggering the voltage comparator 41 to provide a digital output indication from the comparator to indicate a binary one corresponding to the one volt input signal. In terms of the binary notation, the output converter may be considered to be read 0001 reading the least significant bit first.

Further, assuming that the analog signal condition is negative in direction and reaches minus two volts, it will be seen that under these input conditions, an output indication will be derived from the comparator 46 since the two volts provided by the left hand of this comparator cancel out the two volt input signal that cause the triggering of the comparator 41 and accordingly an output signal from the two to the one output circuit. During the same interval, however, it will be seen that the minus two volt analog signal would provide a binary one or two to the zero comparator 48 since the minus two volt analog signal is combined with the one volt signal from the left-hand arm of the comparator 48 to maintain the input signal to the voltage comparator 41 at a negative potential. However, due to the switching of the output potential the $2^1$ output circuit the series diode is switched and its associated resistor conducts into the input circuit for its associated comparator 41 whereby a plus two volt drop is added into the network 43 whereby the combination of the two conductive arms for the network 43 and the comparator 48 provides a plus three volt bias to be combined with the negative two volt analog signal to thereby render the input signal positive to switch the voltage comparator 41 back into its normal condition indicating a binary zero. Therefore with a minus two volt signal the output indication will correctly read 0010.

It should now be recognized that with the continuing increase of the analog signals towards a minus 16 volt switches full scale, the correct digital output will be derived from the converter by causing the correct comparator 41 to be switched on and off. To this end as the voltage increases from minus two to minus three, both of the $2^0$ and $2^1$ outputs will be switched to provide a binary output signal 0011. In the same fashion as the voltage increases another magnitude to minus four volts, the output reads 0100. Any other binary value up to fifteen can be digitized by this four element arrangement. It should be also recognized that although only four comparators are shown in FIGURE 3, it may be extended any number of elements whereby the same weighted network 43 is utilized the input circuit for each voltage comparator 41 except in additional arm is added for each comparison stage added to the converter.

The comparator 41 of FIGURE 3 may comprise a circuit as illustrated in FIGURE 4. The input terminal 61 of the comparator 41 which may be, for example, connected to the bus line 60 of the comparator stage 48 of FIGURE 3, is connected to the base of a normally non-conductive transistor 62 connected in differential arrangement with a transistor 63. Transistor 62 is turned on when the input signal to terminal 61 is 0 or preferably goes slightly negative. A negative input potential at the terminal 61 causes the transistors 62 and 64 to conduct and transistor 63 to be cut off causing an output potential at the collector of the transistor 64 at the terminal 65 to go negative thereby indicating a binary 1. The output potential remains negative while the input signal is negative and when it goes positive again it returns to its original condition to indicate a binary zero. In the embodiment illustrated in FIGURE 3, each of the comparators 41 normally indicates a binary zero and is switched to represent a binary 1. Simultaneous with the switching of a comparator to binary 1, the other comparators 43 are modified as previously discussed.

In the comparator of FIGURE 4, a hysteresis characteristic is included comprising the resistors 66 and 67 to provide a snap action switching characteristic. This hysteresis effect is provided by a positive feed back action coupled from the output transistor 64 to the input of transistor 63. The amount of feed back is dependent on the ratios of the resistors 66 and 67 in FIGURE 3. The feed back may be controlled to provide a hysteresis characteristic that requires an input signal level of more than one-half of the bit or binary character to switch the comparator of FIGURE 4, thus reducing the effect of power supply ripple and input noise. Thus it may be seen that the snap action operation of the comparator of FIGURE 4 reduces the time period required to change from one state to another to a minimum. Such undesirable conditions as partially on, partially off, digital bits as well as sporadic fluctuations caused by noise are sharply reduced.

Referring now to the hysteresisgraph illustrated in FIGURE 5, a switching characteristic of the comparator 41 of FIGURE 4 may be better understood. In FIGURE 5, the dotted line 71 illustrates how the output signal at the terminal 65 of the comparator of FIGURE 4 would change in a conventional system comparator lacking the hysteresis effect of the device of FIGURE 4 as the input changes from A to B. The output changes are shown by the dotted line 71. Introduction of the positive feed back circuit to provide a hysteresis characteristic as illustrated in FIGURE 4 reverses the slope in the line 71 to produce a curve as illustrated by the line 72. As the input changes the start of change of state is delayed until B' when the output then snaps to the other state. Upon changing back the input is retarded until A' before changing state again. Thus the time of change of state is sharply reduced and is achieved in a snap action.

In the electronic quantizer of the system illustrated in FIGURE 1 and FIGURE 2, analog-to-digital converters of varying capacity are provided. Referring now to FIGURE 6, there is illustrated an analog-to-digital converter of FIGURE 3 arranged into a series parallel comparing stages which may comprise the analog-to-digital converters 12a and 12b of the devices of FIGURE 1 and FIGURE 2. The converter of FIGURE 6 is shown for illustration purposes as having a total of 8 comparing stages whereby any binary code digital output up to 255 may be obtained by two series parallel states. The analog-to-digital converter of FIGURE 6 is illustrated with eight bits having a least significant stage utilizing four comparator stages and a most significant stage utilizing four comparator stages. The left-hand group of comparator stages comprises the highest order stage indicating the binary values of $2^4$, $2^5$, $2^6$ and $2^7$ at output terminals fed to output display 82. The lower order stage of right-hand portion of FIGURE 6 comprises stages indicating the binary values of the $2^0$, $2^1$, $2^2$, and $2^3$. The second stage produces the same binary output indications as the four bit analog-to-digital converter of FIGURE 3.

The comparison stages of the first and second stages of the device in FIGURE 6 are arranged in the same fashion as the analog-to-digital converter of FIGURE 3. However, in the eight bit converter of FIGURE 6, the analog signal 77 to be digitized is coupled to the first stage only in a parallel circuit relationship. The reference voltage source 75, however, is coupled in a parallel circuit relationship to all of the comparator stages. The comparator stages of the first and second stages are arranged in the same fashion as the comparator stage of FIGURE 3. The analog signal provided for at the lower stage is derived from a summing amplifier 79 which has its output connected in parallel circuit relationship with each of the comparator stages of the second stage. The summing amplifier 79 is arranged with an input circuit connected to be responsive to the analog signal to be digitized in parallel circuit relationship with the comparator of the first stage in combination with the weighted network 81 similar to the weighted networks described in relation to the device in FIGURE 3. Network 81 does not have a normal conducting arm. It has an arm corresponding to each of the comparator stages of the first stage. Each resistor and series diode combination for each arm is connected by means of a switching diode to the output circuit for an individual comparator stage as described for FIGURE 3. The voltage provided by the network 81 is zero when each of the elements indicate the binary zero. When all of the comparator stages of the first stage indicate a binary zero, the analog signal to be digitized appears at the output of the summing amplifier 79 to be operated on by the second stage. By the same token, whenever any of the comparators of the first stage indicate binary 1 for that stage the corresponding resistor in the network 81 is rendered conductive and provides a voltage corresponding to the binary weight for its associated comparator. Thus the impedance value for each arm of the network 81 bear the relationship of 8421 reading from left to right as illustrated in FIGURE 3. The voltage figure applied to the lower stage is the difference between the value indicated by the upper stage and the value to be indicated by the lower stage. For example, if an analog signal of value 129 is applied to the converter, the upper stage will indicate 128 by switching on only the $2^7$ stage and simultaneously subtracting the voltage corresponding to this value from the analog signal applied to the summing amplifier 79 by switching the right-hand arm on the network 81. This then applies the voltage to the lower stage corresponding to the production of binary 1 to the zero element only for the second stage.

The operation of the eight bit cascaded stages of FIGURE 6 is essentially the same as that described for FIGURE 3 with the exception of the subtraction of the analog signal at the summing amplifier 79. Thus, if the analog signal to be digitized assumes a voltage corresponding to the digits 1 through 15, all of the elements of the upper stage will indicate a binary zero while the lower stage receives the analog signal from the converter and provides the digital output in the same fashion as described for FIGURE 3.

When the analog signal to be digitized is less than 256 volts with the eight bit converter of FIGURE 6 or less than 16 volts for the four bit converter of FIGURE 3, the voltage applied to each comparator will be modified in proportion to the actual voltage for producing the correct output in accordance with the ratio indicated herein.

As previously described, the analog-to-digital converter of FIGURE 6 is applicable to any binary coded system. The output indications may be coded directly in terms of the decimal number system merely by variation of the reference voltages and the impedance values for the weighted networks 81 and the amplifier 79 to produce the correct digital output indication. Similarly, the two cascade arrangements of FIGURE 6 may be utilized to provide binary coded decimal output for any number of decimal orders desired.

Referring now to FIGURE 7, there is illustrated a circuit diagram of a typical summing amplifier 79 utilized in the converter of FIGURE 6. In the amplifier circuit of FIGURE 7, the input signal at the terminal 85 represents the analog signal to be digitized applied to the converter of FIGURE 6. A plurality of transistors 86 have their outputs connected through a corresponding resistor to the bus line 89 between the input 85 and the base of a transistor 87 which receives the input signal. Each of the transistors 86 is controlled with respective base signals from the terminals 91 through 94 corresponding to the weighted networks 43 as described in the converter of FIGURE 3. Thus the amplifier 79 essentially subtracts the value of the digital output signal of the upper stage of the converter of FIGURE 6 from the analog input signal and presents a difference signal to the lower stage four bit converter at the output terminal 87.

The electronic quantizer of the invention in the preferred embodiment utilizes analog-to-digital converters varying from four to eight bits. The four bit converter of FIGURE 3 may be expanded to include a fifth and/ or a sixth bit as illustrated in FIGURE 8. In FIGURE 8, a fifth and sixth bit comparison stage is illustrated in which input terminal 45 receives a reference voltage source and input terminal 47 receives analog signal circuit to be digitized. Terminals 51, 53, 55 and 57 of the device in FIGURE 3 are connected as shown to the output terminals of the comparator stages 41 of the converter of FIGURE 3. The output terminal 61 provides a comparator 41 in combination with the four comparators 41 of FIGURE 3 to realize a five bit analog-to-digital converter and output terminals 61 and 63 taken with associated comparator stages 42 through 48 of FIGURE 3, provides a six bit analog-to-digital comparator in combination with the four bits of FIGURE 3. The operation of the fifth and sixth bit illustrated in FIGURE 8 is the same as previously described for each of the stages 42 to 48 of the four bit analog-to-digital converter of FIGURE 3. In a six bit analog-to-digital converter, the output terminal 63 indicates the binary $2^0$, the output terminal 61 indicates the binary $2^1$ and the terminals 51 through 57 indicate respectively $2^2$, $2^3$, $2^4$, and $2^5$.

Thus, in the electronic quantizer of FIGURES 1 and 2, the six bit analog-to-digital converter 17 may comprise the four bits as illustrated in FIGURE 3 plus the two bits illustrated in FIGURE 8 combined in the manner described above. The five bit analog-to-digital converter 25 of FIGURES 1 and 2 may combine the fifth bit illustrated in FIGURE 8 with the four bits of FIGURE 3. Similarly, the four bit analog-to-digital converter 28 may comprise a circuit illustrated in FIGURE 3.

Figure 9:
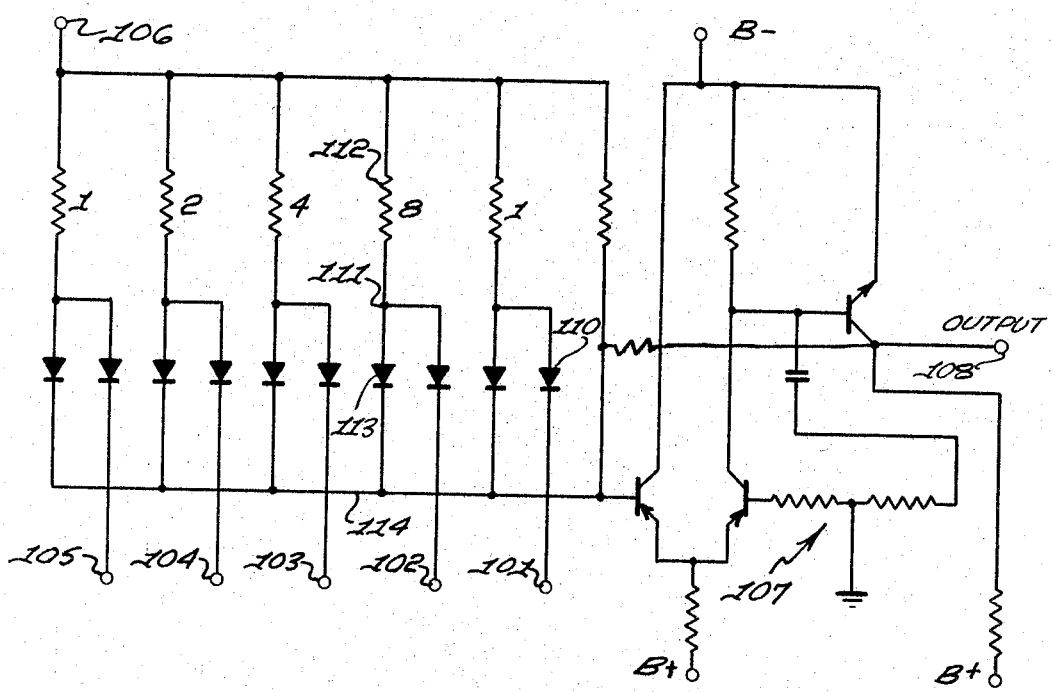
FIGURE 9 is a circuit diagram of a digital-to-analog converter for use in the systems of FIGURE 1 and FIGURE 2.

Referring now to FIGURE 9 there is illustrated a digital-to-analog converter which may be utilized as the digital-to-analog converters of the circuits of the quantizer of FIGURE 1 and FIGURE 2. In FIGURE 9, there is illustrated a five bit digital analog converter with the digital signal applied to input terminals 101, 102, 103, 104 and 105 and the output analog signal obtained through the amplifier 107 at the output terminal 108. Each of the terminals 101 through 105 is connected to switch a corresponding diode which diode is connected to a mid-point between a resistor and diode. The other end of the resistors are connected in common to a bus in a reference voltage applied at terminal 106. The output of the secondary diodes is connected in common to the input of the amplifier 107. Each of the resistors in the converter arms, associated with the input terminals 101 through 105, is weighted in a binary form according to the desired binary code. Thus, the input terminal 102 is connected through a diode 110 to a common point 111 between a resistor 112 weighted 8, and a secondary diode 113. The terminal 103 is connected to an element weighted 4. Terminal 104 is connected to a resistor weighted 2, and terminal 105 is connected to a resistor weighted 1. The terminal 101 is connected through a resistor weighted 1 which is the same as that weighted for number 105. The digital signal supplied through the terminals 101 to 105 is converted to an analog signal and added on the common bus line 114 input to the amplifier 107.

The five bit digital-to-analog converter of FIGURE 9 may comprise the digital-to-analog converter 27 of FIGURE 1 and the converters 27a and 27b of FIGURE 2 which combine to provide a five bit digital-to-analog converter. The terminals 102 to 105 of the converter of FIGURE 9 correspond to the most significant group 13 of FIGURES 1 and 2 and the terminal 101 corresponds to the most significant bit correction signal 26 applied in the devices of FIGURE 1 and FIGURE 2. It is thus seen that the most significant bit correction signal 26 of the quantizers of FIGURE 1 and FIGURE 2 is added to the least significant bit of the bits 13 due to the equal weighting of the resistors connected to terminals 101 and 105. Thus, in effect, the digital-to-analog converter of FIGURE 9 receives digital inputs at the signals 101 and 105, representing the same significant portion. In this manner, the correction bit signals of the quantizers of FIGURE 1 and FIGURE 2 may be added to the other digital bits in the system.

In operation of the digital-to-analog converter of FIGURE 9, it will be assumed that the converter is to be utilized in the device of FIGURE 2 as the converters 27a and 27b and that the correction signal on the bit 26 is equal to 1 to be applied at the terminal 101 with the group 13, equal to 1100 being applied to the terminals 102 and 105. The correction signal at the terminal 101 is connected to the weighted resistor 1 to provide a signal indicative of 1 volt through diode 113 to the bus line 114. Similarly, the digital 1 signal and the terminals 102 and 103 cause weight signals of 8 and 4 to appear on the bus line 114. The combined analog signals on the bus line 114 represent 1101, thereby producing an addition of 1101 and 1.

Figure 10:
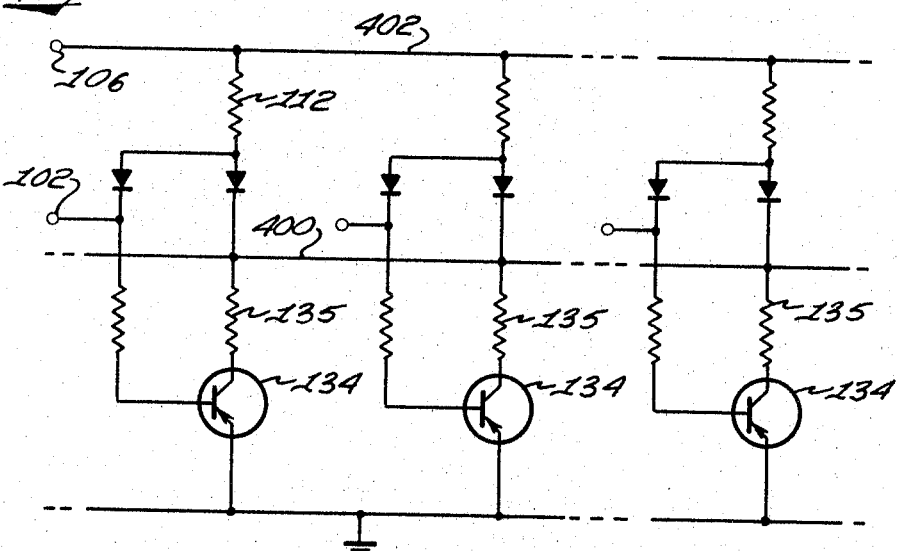
FIGURE 10 is a circuit diagram of a compensating circuit for maintaining constant impedance in the output of the digital analog converter of FIGURE 9.

The digital-to-analog converter as illustrated in FIGURE 9 has a number of parallel precision resistors weighted as herein described connected from the reference terminal 106, through the diode switches into the common bus which feeds into the amplifier 107. In a variety of combinations digital information may be applied through the terminals 101 to 105. An undesirable condition may be created by the switching of the several resistors on the bus. This disadvantage may be overcome by the compensating circuitry illustrated in FIGURE 10. In FIGURE 10 the bus line 402 represents the line connected to the input terminal 106 of the converter in FIGURE 9 and the bus line 400 represents the bus line connected to the input of the amplifier 107. A group of auxiliary resistors 105 are connected from the output bus to ground through transistor switches 134. Each resistor 135 has a corresponding counterpart in the weighted resistors of the converter of FIGURE 9. In operation, when any resistor 112 connected between the reference point 106 and the output bus 400 is switched into the circuit there is a simultaneous switching out of the circuit of a corresponding auxiliary resistor 135 from the bus 400 to ground. This action tends to maintain a constant impedance to ground on the bus. In FIGURE 10, assuming an input terminal 102 is energized by a negative signal indicative of a binary 1, the corresponding weighted resistor 112 is disconnected from the bus through the action of diode switches as hereinbefore explained. Simultaneously, the transistor acts to switch in the auxiliary resistor 105 which compensates for the disconnection of the resistor thus maintaining a constant impedance. Diode switches are used to control the precision currents into the bus while the transistor switches are used to maintain constant impedance. This combination results in reduced circuit costs and greatly improved the accuracy and speed of operation of the digital-to-analog converters utilized in the quantizer of the invention.

Figure 11:
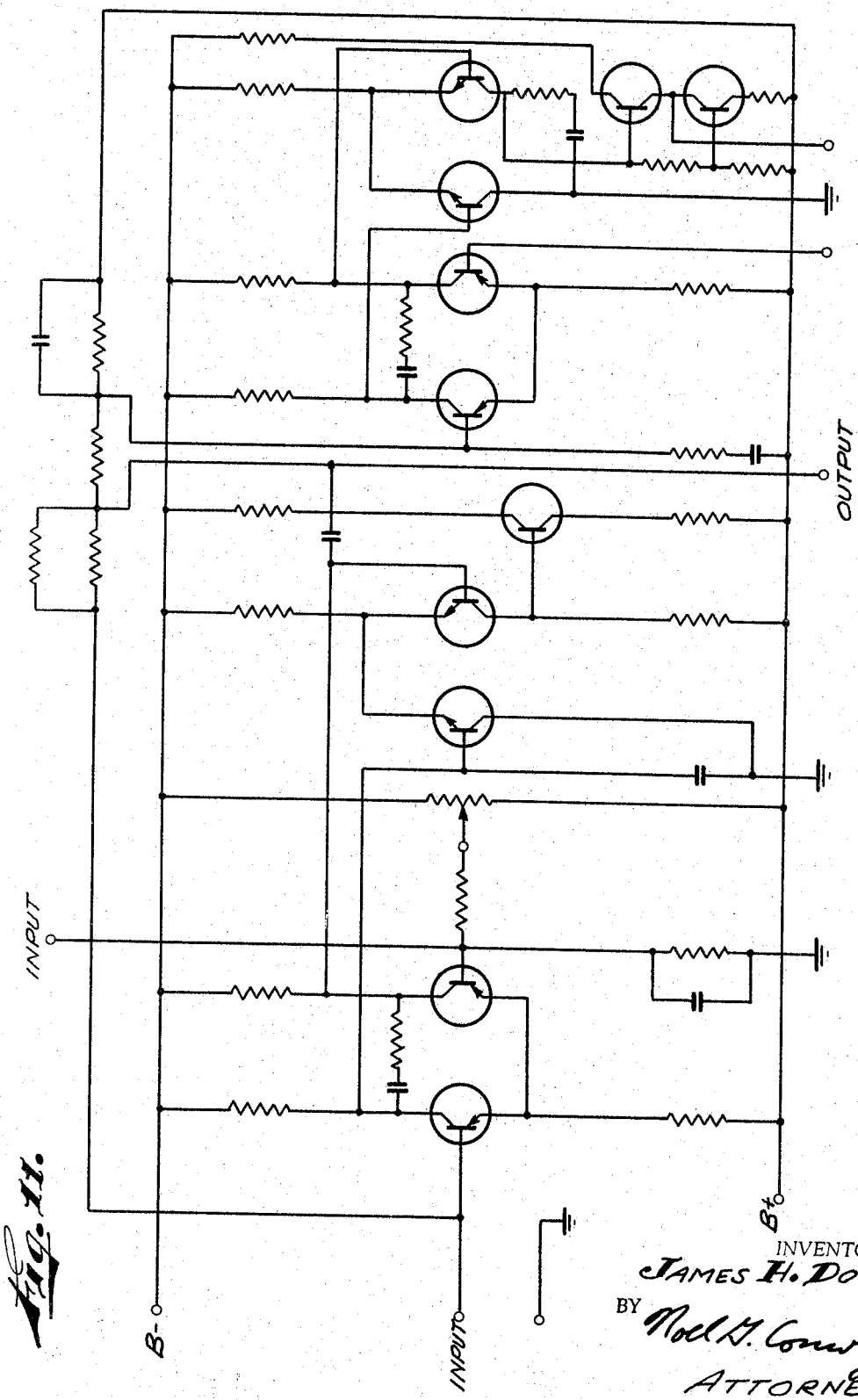
FIGURE 11 is a circuit diagram of a summing amplifier for use as the difference amplifier of FIGURES 1 and 2.

FIGURE 11 is a circuit diagram of a summing amplifier for use as the difference amplifier 16 of FIGURES 1 and 2. In FIGURE 11, there is illustrated a pair of inverter amplifier circuits for receiving a pair of input signals and presenting an output signal corresponding to the difference in the value of the input signal.

Figure 12:
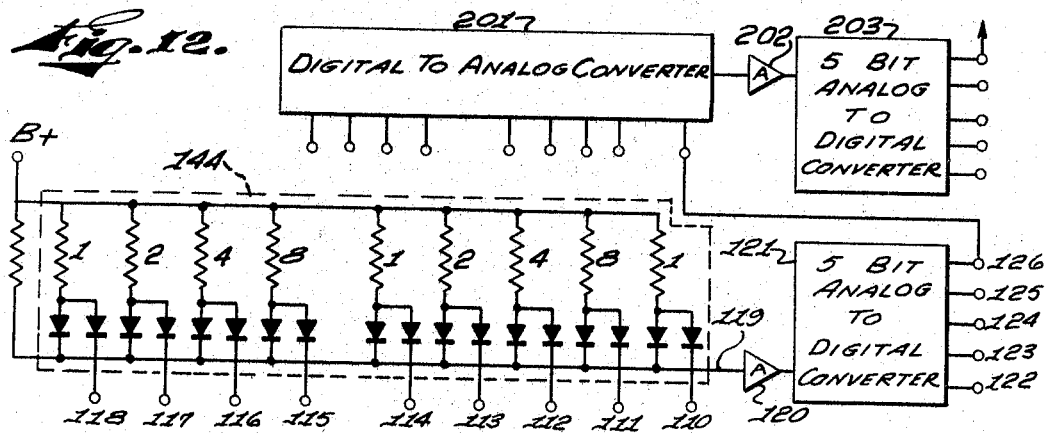
FIGURE 12 is a schematic circuit diagram partly in block of a digital code translator for digital addition.

In the electronic quantizers of FIGURES 1 and 2, the correction signals are combined in digital-to-analog converters with the coarse digital signal amplified and then converted to digital outputs by an analog-to-digital converter. The combination of the digital-to-analog converter 27a and 27b, the amplifier 31 in the analog-to-digital converter 28 of the device in FIGURE 2, for example, may be described as a digital code translator. The circuit diagram of FIGURE 12 illustrates the combining of signals in a digital code translator to perform an addition operation. In the device of FIGURE 12, the digital-to-analog converter 144 comprising diode switches and weighted resistor elements as hereinbefore described in the digital-to-analog converter of FIGURE 9 has its digital input connected to receive digital bits from the terminals 110 to 118 and its analog output presented along the common bus line 119 to an amplifier 120 which provides an analog signal to an analog-to-digital converter 121 which provides a digital output at the terminals 122 to 126. The number of bits supplied to the converter 144 of FIGURE 12 may be of any number and is illustrated as receiving a four bit digital signal at the terminals 115 to 118, a four bit digital signal at the terminals 111 to 114 and a single bit signal at the terminal 110. The resistors are weighted as illustrated so that the number at the terminals 115 to 118 may correspond to a number from zero to fifteen and the number at the terminal 111 to 114 similarly may correspond to a number from one to fifteen while the number at terminal 110 corresponds to one. Thus the digital-to-analog converter 114 is capable of receiving a pair of numbers in value of zero to fifteen plus a one bit at the terminal 110, thereby providing at the output common bus 119 a number equal in rate from zero to thirty-one. The analog-to-digital converter 121 is illustrated as a five bit converter and provides at the output terminals 122 to 126 a number of up to 31. The output terminal 126 of the analog-to-digital converter 121 represents the highest significant bit and is fed as a carry bit to a second upper stage digital code translator including a digital-to-analog converter 201 and an amplifier 202 and an analog-to-digital converter 203 which may comprise a digital code translator operating in the same manner as the translator comprising converter 144, amplifier 120 and converter 126. The carry bit from the terminal 126 is fed into the digital analog converter 201 and weighted as a least significant order of one similar to the weighting of the digital signal at the terminal 110. In this manner, digital code translators may be cascaded as illustrated in the two cascade stages of FIGURE 12 to provide for any number of bit inputs with the digital code translator 201 utilizing the most significant bit from the digital code translator at the terminal 126 as the carry bit to be applied as the lowest significant bit at the digital analog converter 201. This operation may be extended to any number of stages as desired and to any combination of digital numbers may be added in the manner as described for FIGURE 12.

Figure 13:
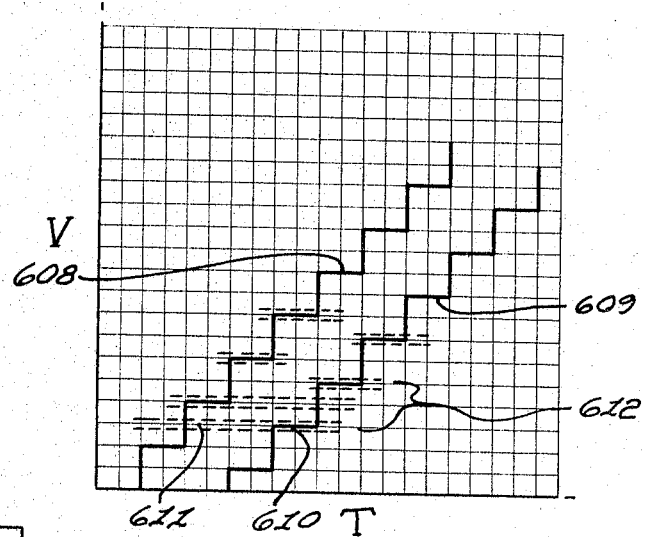
FIGURE 13 is a graph illustrating the wave forms of the output signals derive from the diagram of FIGURE 12.

In FIGURE 13 there is illustrated a graph representing the output signal from the amplifier 120 of the device of FIGURE 12. The curve 608 represents a discretely stepped function which is the output of the amplifier 120 of FIGURE 12. The curve 609 represents a function of the digital output of the analog-to-digital converter 121 of FIGURE 12. The circuit configuration of such an analog-to-digital converter as 121 is designed to change state at approximately in the middle of the rise between each discrete step of the amplifier 120 output. That is, the level 610 of the curve 609 is arranged to be on the same level as the level 611 of the curve 608. As may be seen, the broad tolerance output of a low cost amplifier 120 has no effect on the accuracy of the analog to digital converter 121 output due to the arrangement of levels. The broken line 612 clearly illustrates the tolerance latitude of the basic unit. Preferably, the reference voltage supplied to the digital-to-analog converter 144 is the same as that supplied to the analog-to-digital 121. And, preferably, the one-half bit offset is accomplished by providing a resistor between the B+ reference voltage and the common bus line 119 of a weight of ½. That is, the resistance of said last mentioned resistor is, for example, twice that of the resistor next to it in FIG. 12, which resistor is weighted as 1.

Figure 14:
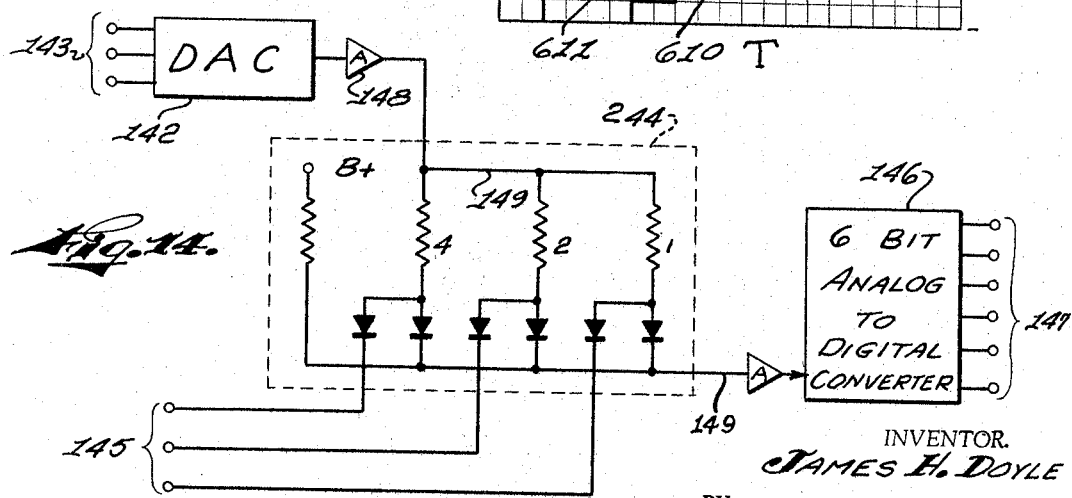
FIGURE 14 is a schematic circuit diagram partly in block of a device for multiplication according to the electronic quantizer system of the invention.

The digital code translator stages as illustrated in FIGURE 12 in the performance of the arithmetic function of addition may also be utilized to provide the arithmetic operations of multiplication and division. As illustrated in FIGURE 14 a three bit digital-to-analog converter 244 receives a three bit digital input 145. A digital-to-analog converter 142 receives a digital input of three bits at the terminal 143. The outputs of the converters 142 and 244 are combined in a multiplication operation with the digital numbers at 143 and 145 multiplied and the multiplicand presented at the output of a six bit analog-to-digital converter 146.

In the multiplier of FIGURE 14, the three bit digital number 143 is converted to an analog signal by digital-to-analog converter 142 amplified by amplifier 148 and fed to the line 149 which comprises the reference voltage line of the digital-to-analog converter 244. The digital number at the three bit terminals 145 is then applied to the diode switches of the digital analog converter 244 in the manner as hereinbefore described in relation to FIGURE 9 with the analog output appearing on the output line 149 being the multiplicand of the numbers 143 and 145. Thus, since the reference voltage at the line 149 corresponds to the value of the number 143, in effect the diode switch networks are supplied with a reference voltage corresponding to the digital number at 143. The analog-to-digital converter 146 converts the multiplicand into a digital signal at the terminals 147. Similar to the adder FIG. 12, the function of the output line 149 is offset from the output function of the analog-to-digital converter 146 by the bias effect of a B+ voltage supply which is connected to the output line 149 through an offset resistor. As in the case of the adder in FIG. 12, the offset is preferably one-half bit.

Figure 15:
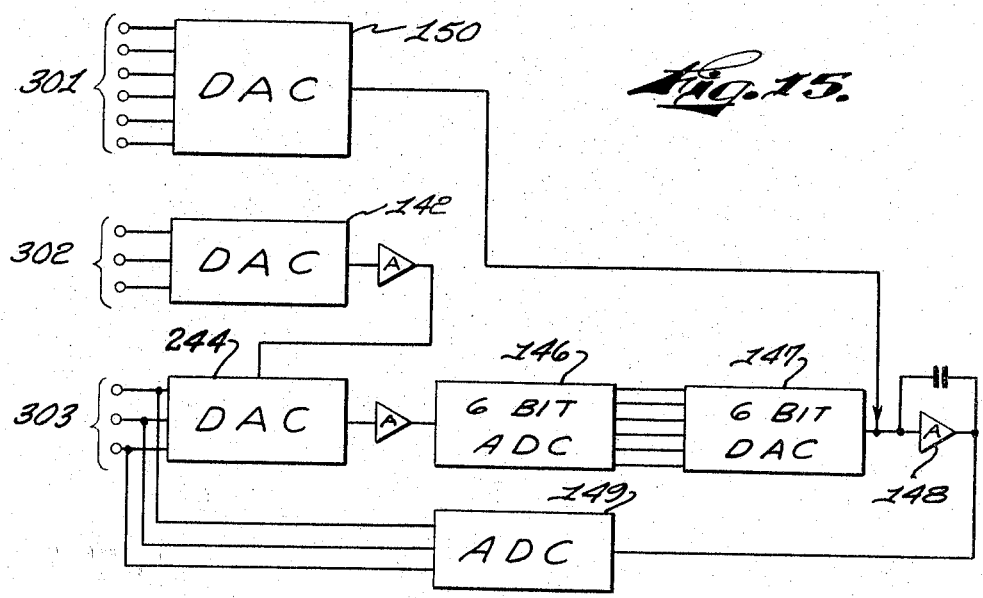
FIGURE 15 is a block diagram of a device for division according to the electronic quantizer system of the invention.

In FIGURE 15, there is illustrated a device utilizing the digital code translator of the electronic quantizer device to perform a division operation. In FIGURE 15, a digital number 301 is divided by a digital number 302 resulting in a quotient of digital number 303. The signal 302 is fed to a digital-to-analog converter which may be the converter 142 of FIGURE 14 with its output combined with a digital-to-analog converter 244 to receive the input from 302 to provide a multiplicand at the output of analog-to-digital converter 146 as previously described for the circuit of FIGURE 14.

Since the digital number 303 is the solution desired, the digital number 301 and the digital number 302 are present at the input terminal. The digital number 301 is applied to digital-to-analog converter 150. The output of the digital-to-analog converter 150 is combined with the output of the digital analog converter 147. This combined output is then applied to an amplifier 148 whose output is applied to an analog-to digital converter 149. The output of the analog-to-digital converter 149 represents the digital number 303 and is applied to the digital-to-analog converter 244. The output of the analog-to-digital converter 149 also provides solutions to the digital number 303. The action of this configuration is such that the output of digital-to-analog converter 147 seeks a value representing digital number 301. When the analog output of the digital-to-analog converter 150 is equal to the analog output of the digital-to-analog converter 147 (which is the number represented by 301), the input to amplifier 148 is zero. Hence, the counting stops at exactly the number 303 represented by the output 303. Thus, as in the previous example of multiplication, 302 times 305 is equal to 301; 303 then can be derived by applying 301 and 302 to the system as shown and the output then becomes 303. Stated another way, the apparatus as illustrated in FIGURE 15 has applied to it, a digital number 302 as shown, and the digital number 301. The result of the digital number 301 is such that a number beings to form proceeding around the loop until such time as the output of the analog-to-digital converter 147 and the digital-to-analog converter 150 are equal and in opposition resulting in a net zero. At that time, the counting stops the number represented at the point of stopping is the solution 303 at the output 303.

Figure 16:
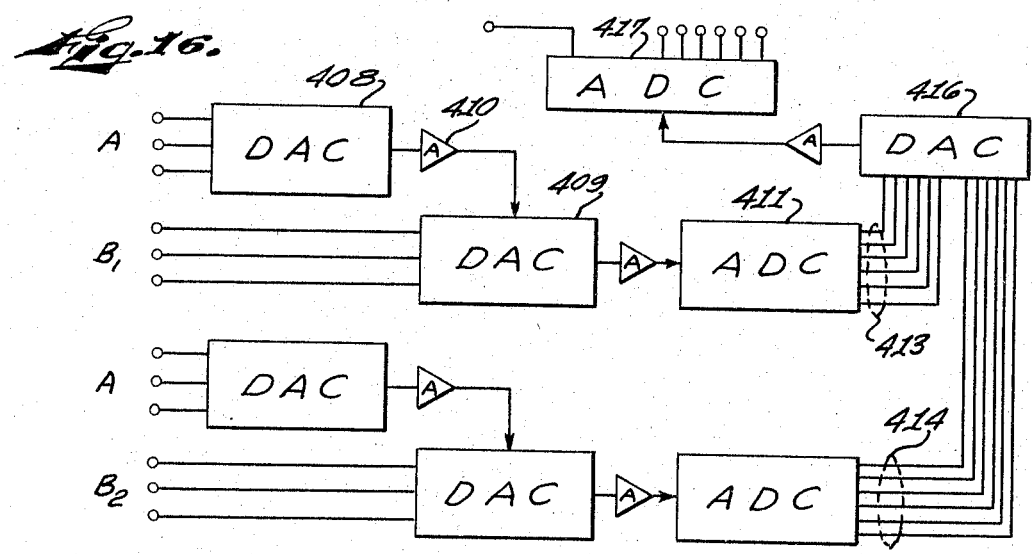
FIGURE 16 is a block diagram of a device for multiplication combining the additional features of FIGURE 12 and the multiplication features of FIGURE 14.

Referring now to FIGURE 16 there is illustrated another multiplication operation in accordance with the principles of the quantizer of the invention. In FIGURE 16 a number A comprising three bits is multiplied by a number B, comprising six bits. To effect multiplication the number B is separated into $B_1$ representing the most significant three bits of B and $B_2$ representing the least significant three bits of B. A first multiplier circuit including the digital-to-analog converters 408 and 409 and amplifier 410, and analog-to-digital converter 411 receives the number A and the number $B_1$. A second multiplier circuit receives a number A and a number $B_2$. The multibit signals 413 and 414 are combined in a digital-to-analog converter 416 and an analog-to-digital converter 417 which together comprises an addition operation as illustrated in FIGURE 12. The output of the analog-to-digital converter 417 represents the product of A and B. The described process in FIGURE 16 of expanding the number of digits can be utilized and operate on any amount of larger numbers.

Figure 17:
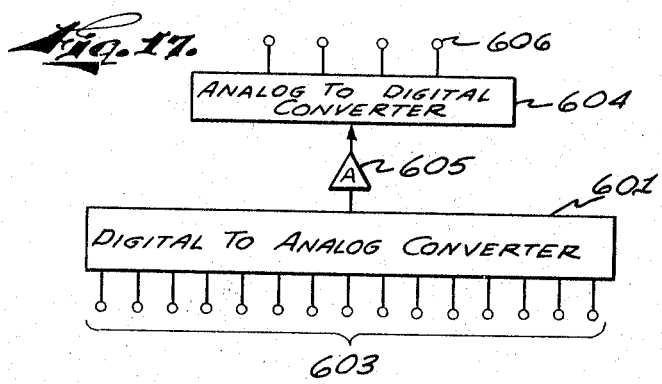
FIGURE 17 is a block diagram of the parity generator according to the electronic quantizer system of the invention.

In FIGURE 17 there is illustrated a digital code translator utilizing the quantizer system of the invention. The translator of FIGURE 17 may be utilized as a parity generator. In data processing systems it is important to know when the number of digits on record at a given time is even or odd. This latter knowledge is required for the purpose of cross-checking the number for accuracy to ascertain that a bit is not lost. In the circuit of FIGURE 17, a multi-bit signal 603 represents for illustration purposes a fifteen bit word which is applied to digital analog converter 601 which has its resistors weighted to provide a weight of one to each of its fifteen lead inputs. The output of the digital analog converter 601 is then applied to an analog digital converter 604 through an amplifier 605. The analog-to-digital converter 604 may be a four bit converter capable of counting from zero to fifteen. Accordingly, when the the number of the bits is odd the significant bit 606 is even, or 1. If the number of bits is even the least significant bit is zero. Thus the least significant bit of the analog-to-digital converter 604 is used as the output indicator of the parity generator. The other more significant bits are not utilized. Although a fifteen bit input is illustrated, the word length may be doubled to thirty bits. For example, the analog-to-digital converter 604 may be expanded to a five bit converter capable of counting from zero to thirty-one. The number of bits in the digital-to-analog converter 601 may be increased to any number according to the word length of the input signal.

The electronic quantizer as described in the invention provides a rapid conversion from an initial electrical analog signal to a multi-bit digital code signal at comparatively high speed and accuracy. The system components are all of low accuracy except for the precision digital analog converter utilized to provide the difference error signal. The system accuracy of the quantizer approaches a product of the individual accuracies of the analog-to-digital converters. For example, if the accuracy of each of the analog-to-digital converters 12 and 17 as described is 1%, the accuracy of electronic quantizer is equal to 0.01%.

Thus, it may be seen that the simplicity and number of low accuracy components of the electronic quantizer combine to provide a highly accurate device for converting analog signals to digital signals. Both accuracy and speed are maintained with speed being realized by the parallel approximation method of the analog-to-digital converters described in which an input signal may be digitized in an asynchronous manner. In this manner, output digital signals are available in extremely short conversion times.

Therefore, it should be realized that although a specific embodiment utilizing specific number of bits has been described for the quantizer of the invention, it is apparent that the present invention is not limited to the combinations shown. It is therefore not intended to restrict the invention otherwise and to the extent indicated in the appended claims.

I claim:
1. In a signal converting system for converting an initial analog signal to a binary coded digital signal, the combination of:
    means including analog-to-digital converter circuitry responsive to said initial analog signal for producing a highest significant group of multibit digital signals;
    means, including digital-to-analog converter circuitry, responsive to said highest significant group of digital signals for producing analog signals;
    means for subtracting each of said analog signals from said initial analog signal to produce difference analog signals;
    means, including analog-to-digital circuitry responsive to said difference analog signals for producing additional lower significant groups of multibit digital signals; and
    means, including digital code translator circuitry, for combining said additional groups of multibit digital signals with said highest signal group of multibit digital signals to produce a digital signal representing said initial analog signal.

2. The combination recited in claim 1 wherein said digital code translator circuitry comprises a digital-to-analog converter for converting said highest significant group and said additional groups of multibit digital signals into analog signals, means for adding said analog signals, and means for converting said analog signals to a digital signal representing said initial analog signal.

3. In an electronic quantizer for converting an initial analog signal to a binary coded digital signal, the combination of:
    first analog-to-digital converter means responsive to said initial analog signal for producing a higher significant group of digital signals and a lower significant group of digital signals;
    first digital-to-analog converter means responsive to said higher significant group of digital signals and said lower significant group of digital signals for producing an analog signal;
    means for subtracting said analog signal from said initial analog signal to produce a difference analog signal;
    second analog-to-digital converter means responsive to said difference analog signal for producing a first group of digital signals, a lower significant portion of said group representing the least significant group of said binary coded digital signal and the higher significant portion of said group representing a higher significant bit correction signal in accordance with said difference analog signal;

means including a first digital code translator responsive to said lower significant group of digital signals and said correction signal for producing a second group of digital signals, the lower significant portion of said second group representing a higher significant group of said binary coded digital signals, and the higher significant portion of said second group representing the highest significant bit correction signals in accordance with said difference analog signal, and means including a second digital code translator responsive to said higher significant group of digital signals at said highest significant bit correction signal for producing a third group of digital signals representing the highest significant group of said binary coded digital signal.

4. The electronic quantizer of claim 3 wherein said first analog-to-digital converter means includes an analog-to-digital converter responsive to said initial analog signal for producing said higher significant group of digital signals;

means including a digital-to-analog converter responsive to said higher significant group of digital signals for producing an analog signal;

means for subtracting said analog signal from said initial analog signal to provide an analog signal representing said higher significant group, and means including an analog-to-digital converter responsive to said higher significant group analog signal for producing said lower significant group of digital signals.

5. The electronic quantizer of claim 3 wherein the higher significant bit correction signal produced by said second analog-to-digital converter means has a digital range corresponding to a portion of said lower significant group of digital signals.

6. The electronic quantizer of claim 3 wherein the highest significant bit correction signal produced by said first digital code translator has a digital range corresponding to a portion of said higher significant group of digital signals.

7. The combination recited in claim 3 wherein said first digital code translator comprises a first digital-to-analog converter for converting said lower significant group of digital signals to an analog signal, a second digital-to-analog converter for converting said correction signal to an analog signal; means for adding said last mentioned analog signals; means for amplifying said added analog signal; and an analog-to-digital converter responsive to said amplified analog signal for producing said second group of digital signals.

8. The combination recited in claim 3 wherein said first and second analog-to-digital converter means include an analog-to-digital converter having a plurality of comparator stages corresponding to the number of bits in the digital signals produced; each of said comparator stages switching from a preselected indication position to another indication condition to thereby define a single binary digit;

means for applying an analog signal to be digitized to each of said comparator stages;

said comparator states each including circuit means connected to be responsive to an output indication from each of the higher valued comparators for modifying the response of each of the lower valued comparators only when at least one of the higher valued comparators is switched to said other indicating condition to provide the correct output at each of the remaining comparators to correctly digitize the applied analog signal.

9. In an electronic quantizer for converting an initial analog signal to a binary coded signal, the combination of:

a first analog-to-digital converter responsive to said initial analog signal for producing a higher significant group of digital signals and a lower significant group of digital signals; means for determining the difference between the value of said higher and lower significant group of digital signals and the value of said initial analog signal to produce an analog error signal;

first means including an analog-to-digital converter for developing a first correction signal in accordance with said analog error signal;

means for combining said first correction signal with said lower significant group of digital signals to produce a higher significant group of said binary coded digital signals;

second means including an analog-to-digital connector responsive to the output of said combining means for developing a second correction signal in accordance with said analog error signal;

and means for combining said second correction signal with said higher significant group of digital signals to produce the highest significant group of said binary coded digital signals.

10. The combination recited in claim 9 wherein said first means for developing a first correction signal comprises; an analog-to-digital converter responsive to said analog error signal for producing a digital signal; said digital signal having a lower significant portion indicative of the least significant group of said binary coded digital signal, and having a higher significant portion indicative of said first correction signal.

11. The combination recited in claim 9 wherein said second means for developing a second correction signal comprises; an analog-to-digital connector responsive to the output of said combining means for producing a digital signal; said digital signal having a lower significant portion indicative of the higher significant group of said binary coded digital signal, and having a higher significant portion indicative of said second correction signal.

12. In an electronic quantizer for converting an initial analog signal to a binary coded digital signal, the combination of;

first analog-to-digital converter means responsive to said initial analog signal for producing a higher significant group of digital signals and a lower significant group of digital signals, the value of said higher and lower significant groups differing from the value of said initial analog signal by the amount of error in said first analog-to-digital converter; a first digital-to-analog converter responsive to said higher and lower significant group for producing a coarse analog signal representing the value of the combined higher and lower significant groups;

a difference amplifier responsive to said initial analog signal and said coarse analog signal for producing an error analog signal;

second analog-to-digital converter means responsive to said error analog signal for producing a first group of digital signals, the lower significant portion of said group representing the least significant group of said binary coded digital signals, and the higher significant portion of said group representing a higher significant bit correction signal in accordance with said difference analog signal; first digital code translator means responsive to said lower significant group and said higher significant correction signal for producing a second group of digital signals, the lower significant portion of said second group representing a higher significant group of said binary coded signal, and the higher significant portion of said second group representing the highest significant bit correction signal in accordance with said error analog signal; and second digital code translator means responsive to said higher significant group of digital signals of said highest significant bit correction signal for providing a third group of digital signals representing the highest significant group of said binary coded digital signal.

13. The combination recited in claim 12 wherein said first digital code translator means comprises a pair of digital-to-analog converters for connecting said lower significant group of digital signals and said higher significant bit correction signal into analog signals and adding said analog signals; an amplifier responsive to said added analog signal for providing an output analog signal; and an analog-to-digital-converter responsive to said output analog signal for providing a digital signal indicative of the value of said added analog signal.

14. The combination recited in claim 12 wherein said first analog-to-digital converter means comprises a first $n$ bit analog-to-digital converter responsive to said initial analog signal for producing a higher significant group digital signals binary $n$ bits; a digital-to-analog converter responsive to said higher significant group for providing an analog signal; an amplifier for subtracting the output of said digital-to-analog converter from said initial analog signal; and a second $n$ bit analog-to-digital converter responsive to the output of said amplifier for producing a lower significant group of digital signals having $n$ bits.

15. In an electronic quantizer for converting an initial analog signal to a binary coded digital signal, the combination of;
a first analog-to-digital converter responsive to said initial analog signal for producing a higher significant group of digital signals of $n$ bits and a lower significant group of digital signal of $n$ bits;
a first digital-to-analog converter responsive to said higher significant group of digital signals and said lower significant group of digital signals for producing an analog signal;
means for subtracting said analog signal from said initial analog signal to produce a difference error analog signal;
a second analog-to-digital converter responsive to said error analog signal for producing a first group of digital signals of $n+2$ bits, a lower significant $n$ bit portion of said group representing the least significant group of said binary coded digital signal and the higher significant 2 bit portion of said group representing a higher significant correction signal in accordance with said error analog signal;
a first digital code translator responsive to said lower significant group of digital signals at said correction signal for providing a second group of digital signals of $n+1$ bits, the lower significant $n$ bit portion of said second group representing a higher significant group of said binary coded digital signal, and the higher significant 1 bit portion of said second group representing the highest significant bit correction signal in accordance with said difference analog signal;
and a second digital code translator responsive to said higher significant group of digital signals and said highest significant bit correction signal for producing a third group of digital signals of $n$ bits representing the highest significant group of said binary coded digital signal.

16. The electronic quantizer of claim 15 wherein $n$ equals 4.

17. The electronic quantizer of claim 15 wherein said first digital-to-analog converter comprises:
a positive source of reference voltage;
an analog output bus;
a plurality of resistors, weighted in accordance with a predetermined binary code;
a diode switch for each said resistor for connecting said reference voltage through said resistor to said analog output bus when actuated;
means responsive to the digital output signal for actuating said diode switches;
a ground reference bus;
an auxiliary resistor corresponding to each said resistor;
a transistor switch for connecting each said auxiliary resistor between said analog output bus and said ground bus, when actuated;
means for actuating said transistor switches in accordance with the actuator of said diode switches;
whereby the impedance of said analog output bus is stabilized.

18. The combination recited in claim 17 wherein the auxiliary resistor corresponding to said resistor has a weighted value equal to said corresponding resistor.

19. A digital code translator for performing multiplication operations comprising:
a first digital-to-analog converter responsive to a first digital signal for producing a first analog signal;
a second digital-to-analog converter responsive to a second digital signal;
said second digital-to-analog converter having a plurality of weighted resistors;
means responsive to said first analog signal for producing a reference voltage;
an analog output bus;
diode switch means responsive to send second digital signal for switching said reference voltage through said weighted resistors to said analog output bus;
said analog output bus providing a signal corresponding to the multiplication of said first and second digital signals; an analog-to-digital converter responsive to the signal on said analog output bus for providing a digital signal indicative of the multiplicand of said first and second digital signals.

20. The device of claim 19 wherein said first and second digital signals have $n$ bits and said multiplicand has $2m$ bits.

21. In a digital code translator for performing a division operation;
a first digital-to-analog converter responsive to a digital signal indicative of the divisor;
a second digital-to-analog converter responsive to a first digital signal;
means for supplying the analog output signal of said first digital-to-analog converter to said second digital-to-analog converter as a reference voltage for said second digital-to-analog converter;
said second digital-to-analog converter having a plurality of weighted resistors;
an analog output bus, and diode switch means responsive to said digital signal for switching said reference voltage through said weighted resistors to said analog output bus;
said analog output bus providing a signal corresponding to the multiplication of said divisor digital signal by said first digital signal;
an analog-to-digital converter responsive to the signal on said analog output bus for producing a digital signal;
a digital-to-analog converter responsive to the output of said analog-to-digital converter for providing an analog signal indicative of the multiplicand of said divisor and said digital signal;
a third digital-to-analog converter responsive to a digital signal indicative of the dividend for producing an analog signal;
an amplifier responsive to the output of said third digital-to-analog converter and said analog-to-digital converter for combining said outputs;
a second analog-to-digital converter responsive to the output of said amplifier for providing a second digital signal;
said second digital signal being connected to said first digital signal at the input of said second digital-to-analog converter, whereby
said first digital signal equals such second digital signal when the output of said amplifier is zero and whereby said first digital signal is indicative of the quotient.

22. The combination recited in claim 21 wherein said dividend digital signals has $n$ bits, said divisor and quotient signals have $n/2$ bits.

23. A digital code translator comprising:
a digital-to-analog converter responsive to a digital signal of $2^{n-1}$ bits;
said digital-to-analog converter having a plurality of weighted resistors, a source of reference voltage; an analog output bus;
diode switch means responsive to said digital signal for $2^{n-1}$ bits for switching said reference voltage through said weighted resistors to said analog output bus;
each of said resistors being weighted equally;
an analog-to-digital converter responsive to the output of said digital-to-analog converter for providing a digital signal of $n$ bits;
the least significant bit of said digital signal being indicative of the presence of an even or an odd number of bits in said digital signal of $2^{n-1}$ bits.

24. The device of claim 23 wherein $n$ is equal to 4.

25. A digital code translator comprising:
a digital-to-analog converter responsive to an input of a predetermined number of digital bits for providing an analog signal output;
an analog-to-digital converter responsive to said analog signal output for providing a digital signal of $m$ bits;
and offset means connected to at least one of said digital-to-analog converter and said analog-to-digital converter for offsetting the output function of the analog-to-digital converter in relation to the output of the digital-to-analog converter by a fraction of a bit, which fraction is in excess of the combined errors of the analog-to-digital converter and the digital-to-analog converter.

26. The digital code translator of claim 25 wherein said digital-to-analog converter comprises:
a plurality of weighted resistors;
a source of reference voltage;
an analog output bus;
diode switch means responsive to said digital signals for switching said reference voltage through said weighted resistors to said analog output bus,
said resistors being weighted in accordance with the values of digital input signals whereby said digital signals are weighted in accordance with their value to provide a signal on said analog input bus corresponding to the addition of said output signals, and said offset means is resistor means connected between said reference voltage source and said analog output bus.

27. The digital code translator set forth in claim 25 wherein said last mentioned means offsets said analog-to-digital converter from said digital-to-analog converter substantially one-half bit.

28. In a signal converting system for converting a first analog signal to a binary coded digital signal, the combination of:
a first analog-to-digital converter connected to and responsive to said first analog signal for producing a first multi-bit digital output; means connected to and responsive to said first digital output for producing an analog error signal representative of the difference between said first digital output and said first analog signal input;
a second analog-to-digital converter connected to and responsive to said error analog signal for producing a second multi-bit digital output; and means for combining a portion of said second digital output with said first digital output to correct said first digital output.

29. The combination set forth in claim 28 including: means for producing a second analog error signal representative of the difference between said first analog signal and the sum of the digital outputs of said first and second analog-to-digital converters;
a third analog-to-digital converter responsive to said second analog error signal for producing a third multi-bit digital output;
and means connected to said second and third digital outputs for combining a portion of said third digital output with said second digital output to correct said second digital output.

30. The combination set forth in claim 28 wherein said first digital output is a significant group of digital signals, and said second digital output is a next lower significant group of digital signals.

31. The combination set forth in claim 30 wherein said third digital output is a group of digital signals next lower in significance than said second digital output.

32. In a signal converting system for converting a first analog signal to a binary coded digital signal, the combination of:
means including analog-to-digital converter circuitry responsive to said first analog signal for producing a highest significant group of multi-bit digital signals;
means including digital-to-analog converter circuitry responsive to said highest significant group of multi-bit digital signals for producing a second analog signal;
means for subtracting said second analog signal from said first analog signal to produce an error analog signal;
means including analog-to-digital converter circuitry responsive to said error signal for producing additional lower groups of multi-bit digital signals;
and means for combining a portion of said lower groups of multi-bit digital signals with said highest significant group of multi-bit digital signals for correcting said highest group of multi-bit digital signals.

33. In combination, a digital code translator for performing an addition operation of a predetermined state comprising:
a digital-to-analog converter responsive to digital input signals to be added;
first means for supplying a digital input signal of $n$ bits to said digital-to-analog converter;
second means for supplying a digital input signal of $m$ bits to said digital-to-analog converter;
said digital-to-analog converter being responsive to $n+m$ bits for providing an analog signal indicative of the addition of the said digital signals;
and an analog-to-digital converter responsive to said analog signal for providing a digital signal of a plurality of bits;
and a second digital code translator for performing an addition operation for a state higher than said predetermined state, said second digital code translator having a second digital-to-analog converter for receiving a second plurality of digital signals and a digital signal corresponding to the highest significant bit of the digital signal produced by the analog-to-digital converter of said first digital code translator, said digital signal being added in said second digital-to-analog converter to said second plurality of digital signals.

34. A digital code translator for performing multiplication operations comprising:
a first digital-to-analog converter means having a first output line and being responsive to a first digital input signal for producing a first analog signal at said output line;
a second digital-to-analog converter means for producing a second analog signal on a second output line in response to said first analog signal and a second multi-bit digital input signal, said second digital-to-analog converter means comprising:
a reference voltage bus connected to the output line of said first digital-to-analog converter;
an analog bus;
a plurality of weighted resistors connected in parallel to said reference voltage bus, said resistors being weighted in accordance with the values of the bits of the second digital input;

switch means connected to said resistors and said analog bus, said switch means being responsive to said second digital input signal for switching said reference voltage through said weighted resistors to said analog bus;

and a second output line connected to said analog bus;

whereby the signal on said second output line is a function of the product of the first digital signal and the second digital signal.

35. In a signal converter system for converting an initial analog signal into a multibit digital output, the combination of:

first analog-to-digital converter circuitry means for producing through a conversion process a digital signal including a first bit of predetermined significance;

second analog-to-digital converter circuitry means for producing after said first analog-to-digital converter circuitry means has completed its conversion process a multibit digital signal having a plurality of bits;

means in said second analog-to-digital converter circuitry means for causing at least some of said last mentioned plurality of bits to have an individual significance which is less than the significance of said first bit and for causing said last mentioned plurality of bits to have significances sufficient that the sum of the significances of said last mentioned plurality of bits is at least equal to the significance of said first bit.

36. The combination set forth in claim 35 including:

means in said second analog-to-digital converter circuitry means for causing the sum of the significances of said last mentioned plurality of bits to be greater than the significance of said first bit.

37. The combination set forth in claim 35 including:

third analog-to-digital converter circuitry means connected to and including said first analog-to-digital converter circuitry means for producing a multi-bit digital signal having a group of bits including said first bit with the significance of said first bit being less than the significance of each of the other bits of said group of bits.

38. The combination set forth in claim 36 including:

means connected to at least one of said plurality of bits and to said first bit for correcting the indication of said first bit in response to the indication of said one of said plurality of bits.

References Cited by the Examiner

UNITED STATES PATENTS

| | | | |
|---|---|---|---|
| 2,775,754 | 12/1956 | Sink | 340—347 |
| 2,976,527 | 3/1961 | Smith | 340—347 |
| 2,994,862 | 8/1961 | Preston | 340—347 |
| 3,017,098 | 1/1962 | Haanstra | 235—172 |
| 3,047,854 | 7/1962 | Coleman | 340—347 |
| 3,146,343 | 8/1964 | Young | 235—150.5 |
| 3,177,350 | 4/1965 | Abbott et al. | 235—150.52 |

MAYNARD R. WILBUR, *Primary Examiner.*

DARYL W. COOK, W. J. KOPACZ, *Assistant Examiners.*

UNITED STATES PATENT OFFICE
CERTIFICATE OF CORRECTION

Patent No. 3,311,910                           March 28, 1967

James H. Doyle

It is hereby certified that error appears in the above numbered patent requiring correction and that the said Letters Patent should read as corrected below.

Column 15, line 59, strike out "even, or"; column 21, lines 3 and 8, and 17, for "$2^{n-1}$", each occurrence, read -- $2^n-1$ --.

Signed and sealed this 7th day of January 1969.

(SEAL)
Attest:

Edward M. Fletcher, Jr.                        EDWARD J. BRENNER
Attesting Officer                              Commissioner of Patents